(12) United States Patent
Li et al.

(10) Patent No.: US 11,848,623 B2
(45) Date of Patent: Dec. 19, 2023

(54) VOLTAGE CONTROL METHOD, INVERTER, AND VOLTAGE CONTROL APPARATUS

(71) Applicant: Huawei Digital Power Technologies Co., Ltd, Shenzhen (CN)

(72) Inventors: Lin Li, Shanghai (CN); Zhiwu Xu, Shanghai (CN); Haibin Guo, Shanghai (CN)

(73) Assignee: Huawei Digital Power Technologies Co., Ltd, Shenzhen (CN)

( * ) Notice: Subject to any disclaimer, the term of this patent is extended or adjusted under 35 U.S.C. 154(b) by 84 days.

(21) Appl. No.: 17/669,111

(22) Filed: Feb. 10, 2022

(65) Prior Publication Data

US 2022/0255461 A1 Aug. 11, 2022

(30) Foreign Application Priority Data

Feb. 10, 2021 (CN) .......................... 202110183960.6

(51) Int. Cl.
*H02M 7/5387* (2007.01)
*H02M 1/00* (2006.01)
*H02J 3/38* (2006.01)

(52) U.S. Cl.
CPC ......... *H02M 7/53871* (2013.01); *H02J 3/381* (2013.01); *H02M 1/0009* (2021.05); *H02J 2300/24* (2020.01); *H02J 2300/28* (2020.01)

(58) Field of Classification Search
CPC .................... H02M 7/53871; H02M 1/0009
See application file for complete search history.

(56) References Cited

U.S. PATENT DOCUMENTS

| | | | |
|---|---|---|---|
| 9,413,260 B1 * | 8/2016 | Wu ...................... | H02M 7/4835 |
| 2011/0096055 A1 * | 4/2011 | Lin ...................... | H05B 45/325 |
| | | | 345/211 |
| 2016/0065049 A1 * | 3/2016 | Wu ........................ | G01R 31/40 |
| | | | 702/65 |
| 2023/0155386 A1 * | 5/2023 | Zhao ................... | H02M 1/0025 |
| | | | 320/109 |

FOREIGN PATENT DOCUMENTS

CN   101982918 A   *   3/2011
CN   201821118 U   *   5/2011
(Continued)

*Primary Examiner* — Sisay G Tiku
(74) *Attorney, Agent, or Firm* — Leydig, Voit & Mayer, Ltd.

(57) ABSTRACT

A voltage source inverter includes a bus capacitor, a bidirectional power tube, a filter inductor, and a filter capacitor. A voltage control method includes: respectively obtaining a first feedback current and a first feedback voltage from an output end of the filter inductor and an output end of the filter capacitor; obtaining a first duty cycle and a second duty cycle based on the first feedback current, a maximum current reference value, and a minimum current reference value in a current loop; obtaining a third duty cycle based on the first feedback voltage and a voltage reference value in a voltage loop; and selecting one of the first duty cycle, the second duty cycle, and the third duty cycle, and controlling the bidirectional power tube, so that a duty cycle of the bidirectional power tube is between the first duty cycle and the second duty cycle.

15 Claims, 15 Drawing Sheets

(56) References Cited

FOREIGN PATENT DOCUMENTS

| CN | 102412593 | A | * | 4/2012 | |
|---|---|---|---|---|---|
| CN | 102684595 | A | * | 9/2012 | |
| CN | 101847875 | B | * | 10/2012 | |
| CN | 103326399 | A | * | 9/2013 | |
| CN | 103001247 | B | | 9/2014 | |
| CN | 104767220 | A | | 7/2015 | |
| CN | 110707742 | A | | 1/2020 | |
| CN | 111130372 | A | * | 5/2020 | ............ H02M 7/487 |
| CN | 111130372 | A | | 5/2020 | |

* cited by examiner

VOLTAGE CONTROL METHOD, INVERTER, AND VOLTAGE CONTROL APPARATUS

CROSS-REFERENCE TO RELATED APPLICATION

This application claims priority to Chinese Patent Application No. 202110183960.6, filed on Feb. 10, 2021, which is hereby incorporated by reference in its entirety.

TECHNICAL FIELD

This application relates to the circuit field, and in particular, to a voltage control method, an inverter, and a voltage control apparatus.

BACKGROUND

When an inverter runs off-grid, the inverter may serve as a voltage source, to supply a voltage to a load. A high-quality voltage waveform and a high response speed are key to power supply. Currently, an outer voltage loop and an inner current loop are usually connected in series, to implement dual control on a voltage and a current. Finally, the inverter is used to supply power to the load. However, when the voltage loop and the current loop are connected in series, because the two loops affect each other, a parameter design of the current loop and the voltage loop is complex, thereby affecting stability of a system. In addition, bandwidth of the voltage loop is limited due to addition of the current loop, thereby affecting a response speed of the system.

SUMMARY

This application provides a voltage control method, an inverter, and a voltage control apparatus, to help improve a response speed and stability of a system.

According to a first aspect, a voltage control method is provided, applied to a voltage source inverter. The voltage source inverter includes a bus capacitor, a bidirectional power tube, a filter inductor, and a filter capacitor, the bus capacitor is connected to one end of the bidirectional power tube, the other end of the bidirectional power tube is connected to one end of the filter inductor, the other end of the filter inductor is connected to the filter capacitor, and the method includes: respectively obtaining a first feedback current and a first feedback voltage from an output end of the filter inductor and an output end of the filter capacitor; obtaining a first duty cycle and a second duty cycle based on the first feedback current, a maximum current reference value, and a minimum current reference value in a current loop; obtaining a third duty cycle based on the first feedback voltage and a voltage reference value in a voltage loop; and selecting one of the first duty cycle, the second duty cycle, and the third duty cycle, and controlling the bidirectional power tube, so that a duty cycle of the bidirectional power tube is between the first duty cycle and the second duty cycle.

In this embodiment of this application, the inverter controls a current by using the current loop, and controls a voltage by using the voltage loop. The voltage loop and a double current loop run in parallel, and the current loop is used to dynamically limit amplitude of the voltage loop, to make a delay shorter than a delay in running of the voltage loop and the current loop in series. In addition, it is easier to separately design parameters of the current loop and the voltage loop, to help improve stability and a response speed of a system.

With reference to the first aspect, in an implementation of the first aspect, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

In this embodiment of this application, it can be understood that the first duty cycle and the second duty cycle are an upper limit and a lower limit of the duty cycle of the bidirectional power tube. When the third duty cycle does not exceed the upper limit and the lower limit of the duty cycle of the bidirectional power tube, the duty cycle of the bidirectional power tube may be the third duty cycle, namely, a duty cycle corresponding to the voltage loop. When the third duty cycle exceeds the upper limit and the lower limit, the duty cycle of the bidirectional power tube may be the upper limit or the lower limit, namely, a duty cycle corresponding to the current loop. Therefore, a process in which the current loop is used to limit amplitude of the voltage loop is implemented.

With reference to the first aspect, in an implementation of the first aspect, the first feedback current and the first feedback voltage are obtained in a stationary coordinate system; the obtaining a first duty cycle and a second duty cycle based on the first feedback current, a maximum current reference value, and a minimum current reference value in a current loop includes: performing coordinate conversion on the first feedback current, to obtain a second feedback current in a rotating coordinate system; and obtaining the first duty cycle and the second duty cycle based on the second feedback current, the maximum current reference value, and the minimum current reference value in the current loop; the obtaining a third duty cycle based on the first feedback voltage and a voltage reference value in a voltage loop includes: performing coordinate conversion on the first feedback voltage, to obtain a second feedback voltage in the rotating coordinate system; and obtaining the third duty cycle based on the second feedback voltage and the voltage reference value in the voltage loop; and the selecting one of the first duty cycle, the second duty cycle, and the third duty cycle, and controlling the bidirectional power tube includes: selecting one of the first duty cycle, the second duty cycle, and the third duty cycle as a first target duty cycle; and performing coordinate conversion on the first target duty cycle, to obtain a second target duty cycle in the stationary coordinate system, and controlling the bidirectional power tube, so that the duty cycle of the bidirectional power tube is between the first duty cycle and the second duty cycle.

In this embodiment of this application, in the rotating coordinate system, the inverter runs the voltage loop and the double current loops in parallel, and the current loop is used to dynamically limit amplitude of the voltage loop, so that the current loop controls a current, and the voltage loop controls an output voltage, to help improve stability and a response speed of a system.

With reference to the first aspect, in an implementation of the first aspect, the current loop includes a first current loop and a second current loop; and the obtaining the first duty cycle and the second duty cycle based on the second feedback current, the maximum current reference value, and the minimum current reference value in the current loop includes: obtaining the first duty cycle based on the second feedback current and the maximum current reference value in the first current loop; and obtaining the second duty cycle based on the second feedback current and the minimum current reference value in the second current loop.

In this embodiment of this application, the inverter controls a current by using the current loop, to avoid an overcurrent risk, and achieve stability of a system.

With reference to the first aspect, in an implementation of the first aspect, the obtaining a third duty cycle based on the first feedback voltage and a voltage reference value in a voltage loop includes: determining, as a new voltage reference value, a value obtained by subtracting a product of the first feedback current and a preset coefficient from the voltage reference value; and obtaining the third duty cycle based on the first feedback voltage and the new voltage reference value.

In this embodiment of this application, the inverter adds virtual impedance to the voltage reference value, to improve stability of a system.

With reference to the first aspect, in an implementation of the first aspect, an upstream of the bus capacitor includes at least one of the following: an energy storage device, a photovoltaic device, or a wind power device.

According to a second aspect, an inverter is provided, including a bus capacitor, a bidirectional power tube, a filter inductor, a filter capacitor, and a processing unit, where the bus capacitor is connected to one end of the bidirectional power tube, the other end of the bidirectional power tube is connected to one end of the filter inductor, the other end of the filter inductor is connected to the filter capacitor, the filter inductor, the filter capacitor, and the processing unit are connected, and the processing unit is configured to: respectively obtain a first feedback current and a first feedback voltage from an output end of the filter inductor and an output end of the filter capacitor; obtain a first duty cycle and a second duty cycle based on the first feedback current, a maximum current reference value, and a minimum current reference value in a current loop; obtain a third duty cycle based on the first feedback voltage and a voltage reference value in a voltage loop; and select one of the first duty cycle, the second duty cycle, and the third duty cycle, and control the bidirectional power tube, so that a duty cycle of the bidirectional power tube is between the first duty cycle and the second duty cycle.

With reference to the second aspect, in an implementation of the second aspect, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

With reference to the second aspect, in an implementation of the second aspect, the first feedback current and the first feedback voltage are obtained in a stationary coordinate system; and the processing unit is configured to: perform coordinate conversion on the first feedback current, to obtain a second feedback current in a rotating coordinate system; obtain the first duty cycle and the second duty cycle based on the second feedback current, the maximum current reference value, and the minimum current reference value in the current loop; perform coordinate conversion on the first feedback voltage, to obtain a second feedback voltage in the rotating coordinate system; obtain the third duty cycle based on the second feedback voltage and the voltage reference value in the voltage loop; select one of the first duty cycle, the second duty cycle, and the third duty cycle as a first target duty cycle; and perform coordinate conversion on the first target duty cycle, to obtain a second target duty cycle in the stationary coordinate system, and control the bidirectional power tube, so that the duty cycle of the bidirectional power tube is between the first duty cycle and the second duty cycle.

With reference to the second aspect, in an implementation of the second aspect, the current loop includes a first current loop and a second current loop; and the processing unit is configured to: obtain the first duty cycle based on the second feedback current and the maximum current reference value in the first current loop; and obtain the second duty cycle based on the second feedback current and the minimum current reference value in the second current loop.

With reference to the second aspect, in an implementation of the second aspect, the processing unit is configured to: determine, as a new voltage reference value, a value obtained by subtracting a product of the first feedback current and a preset coefficient from the voltage reference value; and obtain the third duty cycle based on the first feedback voltage and the new voltage reference value.

With reference to the second aspect, in an implementation of the second aspect, an upstream of the bus capacitor includes at least one of the following: an energy storage device, a photovoltaic device, or a wind power device.

According to a third aspect, a voltage control apparatus is provided, applied to a voltage source inverter, where the voltage source inverter includes a bus capacitor, a bidirectional power tube, a filter inductor, and a filter capacitor, the bus capacitor is connected to one end of the bidirectional power tube, the other end of the bidirectional power tube is connected to one end of the filter inductor, the other end of the filter inductor is connected to the filter capacitor, and the apparatus includes an obtaining module (e.g., a current sensor and a voltage sensor) and a processing module (e.g., a processor). The obtaining module is configured to respectively obtain a first feedback current and a first feedback voltage from an output end of the filter inductor and an output end of the filter capacitor. The processing module is configured to: obtain a first duty cycle and a second duty cycle based on the first feedback current, a maximum current reference value, and a minimum current reference value in a current loop; obtain a third duty cycle based on the first feedback voltage and a voltage reference value in a voltage loop; select one of the first duty cycle, the second duty cycle, and the third duty cycle, and control the bidirectional power tube, so that a duty cycle of the bidirectional power tube is between the first duty cycle and the second duty cycle.

With reference to the third aspect, in an implementation of the third aspect, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

With reference to the third aspect, in an implementation of the third aspect, the first feedback current and the first feedback voltage are obtained in a stationary coordinate system; and the processing module is specifically configured to: perform coordinate conversion on the first feedback current, to obtain a second feedback current in a rotating coordinate system; obtain the first duty cycle and the second duty cycle based on the second feedback current, the maximum current reference value, and the minimum current reference value in the current loop; perform coordinate conversion on the first feedback voltage, to obtain a second feedback voltage in the rotating coordinate system; obtain the third duty cycle based on the second feedback voltage and the voltage reference value in the voltage loop; select one of the first duty cycle, the second duty cycle, and the third duty cycle as a first target duty cycle; and perform coordinate conversion on the first target duty cycle, to obtain a second target duty cycle in the stationary coordinate system, and control the bidirectional power tube, so that the duty cycle of the bidirectional power tube is between the first duty cycle and the second duty cycle.

With reference to the third aspect, in an implementation of the third aspect, the current loop includes a first current loop and a second current loop; and the processing module is configured to: obtain the first duty cycle based on the second feedback current and the maximum current reference value in the first current loop; and obtain the second duty cycle based on the second feedback current and the minimum current reference value in the second current loop.

With reference to the third aspect, in an implementation of the third aspect, the processing module is configured to: determine, as a new voltage reference value, a value obtained by subtracting a product of the first feedback current and a preset coefficient from the voltage reference value; and obtain the third duty cycle based on the first feedback voltage and the new voltage reference value.

With reference to the third aspect, in an implementation of the third aspect, an upstream of the bus capacitor includes at least one of the following: an energy storage device, a photovoltaic device, or a wind power device.

According to a fourth aspect, a processing apparatus is provided, including a processor. The processor is coupled to a memory, and may be configured to execute instructions in the memory, to implement the method in any possible implementation of any one of the foregoing aspects. Optionally, the apparatus further includes the memory. Optionally, the apparatus further includes a communications interface, and the processor is coupled to the communications interface.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

The processing apparatus in the fifth aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and may be implemented by reading software code stored in the memory. The memory may be integrated into the processor, or may be located outside the processor and exist independently.

According to a fifth aspect, a processor is provided. The processor includes an input circuit, an output circuit, and a processing circuit. The processing circuit is configured to: receive a signal by using the input circuit, and transmit the signal by using the output circuit, so that the processor performs the method in any possible implementation of the first aspect.

During specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, which is used as the input circuit and the output circuit at different moments. Specific implementations of the processor and the circuits are not limited in this embodiment of this application.

According to a sixth aspect, a computer program product is provided. The computer program product includes a computer program (which may also be referred to as code or instructions). When the computer program is run, a computer is enabled to perform the method in any possible implementation of the first aspect.

According to a seventh aspect, a computer-readable storage medium is provided. The computer-readable storage medium stores a computer program (which may also be referred to as code or instructions). When the computer program runs on a computer, the computer performs the method in any possible implementation of the first aspect.

DESCRIPTION OF EMBODIMENTS

Figure 1:
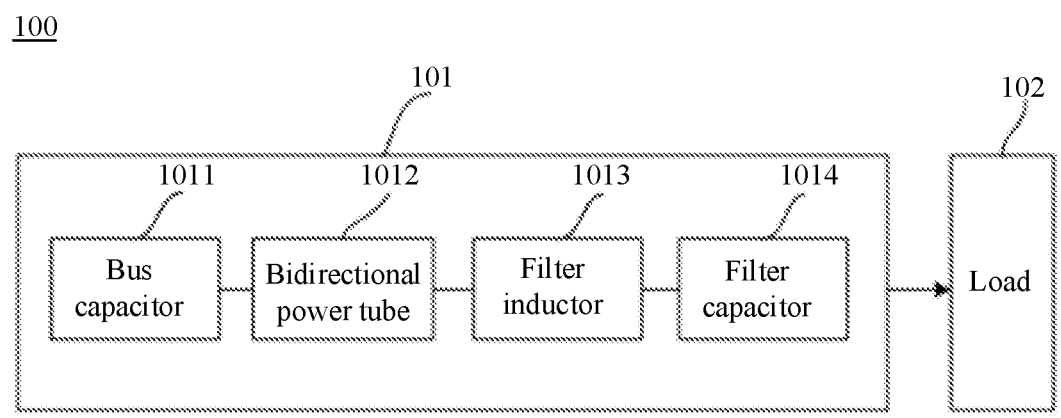
FIG. 1 is a schematic diagram of an application scenario according to an embodiment of this application.

The following describes technical solutions of this application with reference to accompanying drawings.

For ease of understanding, related terms used in this application are first described.

1. Current Loop

In a current feedback system, an output current is usually processed in a positive feedback or negative feedback manner, mainly to improve performance of the system by improving stability of the current.

2. Voltage Loop

In a voltage feedback system, an output voltage is usually processed in a positive feedback or negative feedback manner, mainly to improve performance of the system by improving stability of the voltage.

3. Stationary Coordinate System and a Rotating Coordinate System

The stationary coordinate system may include two coordinate axes (an axis $\alpha$ and an axis $\beta$ are used as an example for description in embodiments of this application), or may include three coordinate axes (an axis a, an axis b, and an axis c are used as an example for description in embodiments of this application). Therefore, in embodiments of this application, the stationary coordinate system is also referred to as a stationary coordinate system $\alpha\beta$ or a stationary coordinate system abc.

The rotating coordinate system may include two coordinate axes. In embodiments of this application, an axis d and an axis q are used as an example for description. Therefore, in embodiments of this application, the rotating coordinate system is also referred to as a rotating coordinate system dq.

For example, coordinate values of the stationary coordinate system abc may be converted into coordinate values of the stationary coordinate system $\alpha\beta$ by being multiplied by the following matrix $C_1$:

$$C_1 = \sqrt{\frac{2}{3}} \begin{bmatrix} 1 & 0 \\ -1/2 & \sqrt{3}/2 \\ -1/2 & -\sqrt{3}/2 \end{bmatrix}$$

For example, coordinate values of the stationary coordinate system $\alpha\beta$ may be converted into coordinate values of the stationary coordinate system abc by being multiplied by the following matrix $C_2$:

$$C_2 = \sqrt{\frac{2}{3}} \begin{bmatrix} 1 & -1/2 & -1/2 \\ 0 & \sqrt{3}/2 & -\sqrt{3}/2 \end{bmatrix}$$

For example, coordinate values of the stationary coordinate system $\alpha\beta$ may be converted into coordinate values of the rotating coordinate system dq by being multiplied by the following matrix $C_3$:

$$C_3 = \begin{bmatrix} \cos\theta & \sin\theta \\ -\sin\theta & \cos\theta \end{bmatrix}$$

For example, coordinate values of the rotating coordinate system dq may be converted into coordinate values of the stationary coordinate system $\alpha\beta$ by being multiplied by the following matrix $C_4$:

$$C_4 = \begin{bmatrix} \cos\theta & -\sin\theta \\ \sin\theta & \cos\theta \end{bmatrix}$$

For example, coordinate values of the stationary coordinate system abc may be converted into coordinate values of the stationary coordinate system dq by being multiplied by the following matrix $C_5$:

$$C_5 = \begin{bmatrix} \cos\theta & -\sin\theta \\ \cos(\theta - 2\pi/3) & -\sin(\theta - 2\pi/3) \\ \cos(\theta + 2\pi/3) & -\sin(\theta + 2\pi/3) \end{bmatrix}$$

For example, coordinate values of the stationary coordinate system dq may be converted into coordinate values of the stationary coordinate system abc by being multiplied by the following matrix $C_6$:

$$C_6 = \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix}$$

Application scenarios in embodiments of this application are described below. When an inverter runs off the-grid, the inverter may be connected to a load, to convert a direct current into an alternating current, so that the inverter serves as a voltage source, to supply a voltage to the load. The inverter may alternatively be referred to as an inverter circuit. In this application, a circuit structure including the inverter and the load is referred to as a voltage source inverter circuit.

FIG. 1 is a schematic diagram of a voltage source inverter circuit 100 according to an embodiment of this application. As shown in FIG. 1, the voltage source inverter circuit 100 includes a voltage-type inverter 101 and a load 102. The voltage-type inverter 101 is connected to the load 102, to supply an alternating current voltage to the load 102. The voltage-type inverter 101 includes a bus capacitor 1011, a bidirectional power tube 1012, a filter inductor 1013, and a filter capacitor 1014. The bus capacitor 1011 is connected to one end of the bidirectional power tube 1012, the other end of the bidirectional power tube 1012 is connected to one end of the filter inductor 1013, and the other end of the filter inductor 1013 is connected to the filter capacitor 1014 and the load 102.

It should be understood that the voltage-type inverter is an inverter whose direct current power supply of an inverter circuit is a voltage source.

Figure 2:
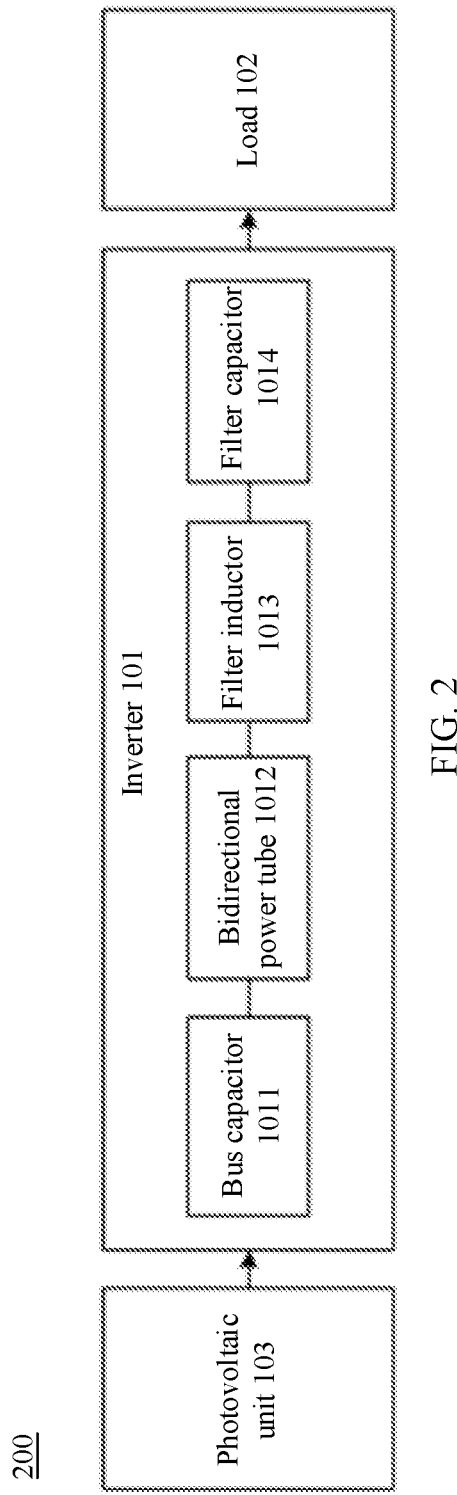
FIG. 2 is a schematic diagram of a photovoltaic system according to an embodiment of this application.

It should be understood that the voltage source inverter circuit provided in this embodiment of this application may be applied to systems such as an energy storage system, a photovoltaic system, or a wind power system. This is not limited in this embodiment of this application. With reference to FIG. 2, an application scenario of this embodiment of this application is described below by using the photovoltaic system as an example.

FIG. 2 is a schematic diagram of a photovoltaic system 200 according to an embodiment of this application. As shown in FIG. 2, the photovoltaic system 200 includes a photovoltaic unit 103, an inverter 101, and a load 102. The photovoltaic unit 103 is connected to the inverter 101, to supply an alternating current voltage to the load 102. The inverter 101 includes a bus capacitor 1011, a bidirectional power tube 1012, a filter inductor 1013, and a filter capacitor 1014. The bus capacitor 1011 is connected to one end of the bidirectional power tube 1012, the other end of the bidirectional power tube 1012 is connected to one end of the filter inductor 1013, and the other end of the filter inductor 1013 is connected to the filter capacitor 1014 and the load 102.

In another scenario, the photovoltaic unit 103 may alternatively be replaced by an energy storage unit, a wind power unit, or the like. This is not limited in this embodiment of this application.

It should be understood that, according to different quantities of phases of an alternating current voltage output by the inverter, the inverter may include a single-phase inverter, a three-phase inverter, and a multi-phase inverter. In this application, a voltage source inverter circuit including a single-phase inverter is referred to as a single-phase voltage source inverter circuit, and a voltage source inverter circuit including a three-phase inverter is referred to as a three-phase voltage source inverter circuit.

Figure 3:
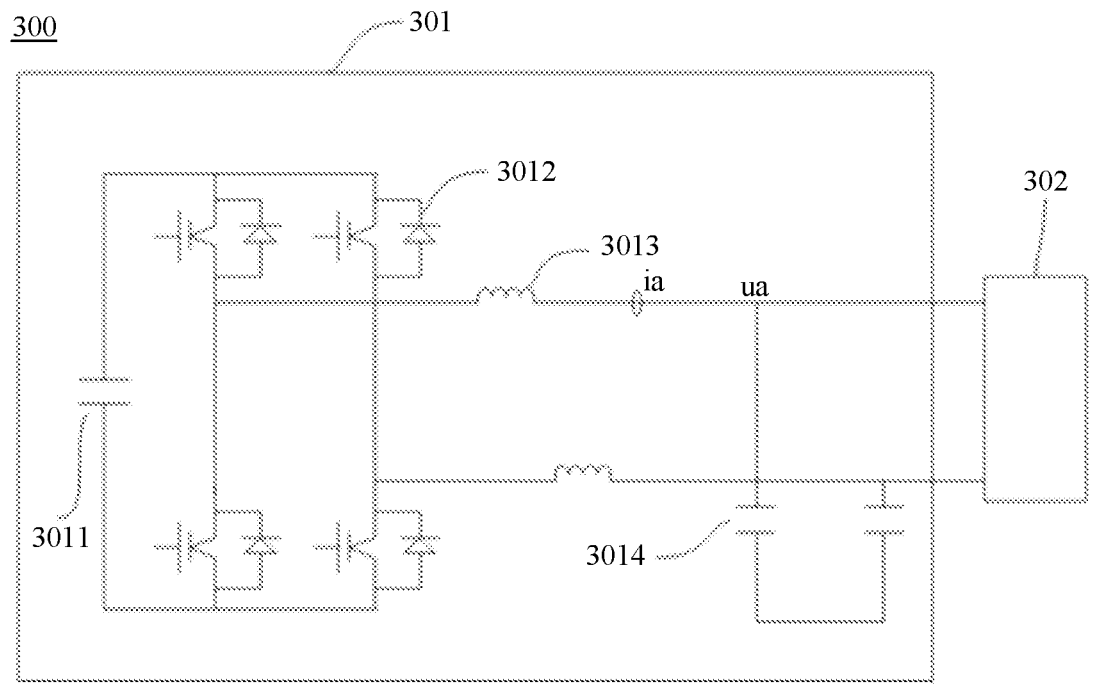
FIG. 3 is a schematic diagram of another application scenario according to an embodiment of this application.

FIG. 3 is a schematic diagram of a single-phase voltage source inverter circuit 300. The single-phase voltage source inverter circuit 300 includes a voltage-type inverter 301 and a load 302. The voltage-type inverter 301 is connected to the load 302, to supply a single-phase alternating current voltage to the load 302. The voltage-type inverter 301 includes a bus capacitor 3011, a bidirectional power tube 3012, a filter inductor 3013, and a filter capacitor 3014. The bus capacitor 3011 is connected to one end of the bidirectional power tube 3012, the other end of the bidirectional power tube 3012 is connected to one end of the filter inductor 3013, and the other end of the filter inductor 3013 is connected to the filter capacitor 3014.

Figure 4:
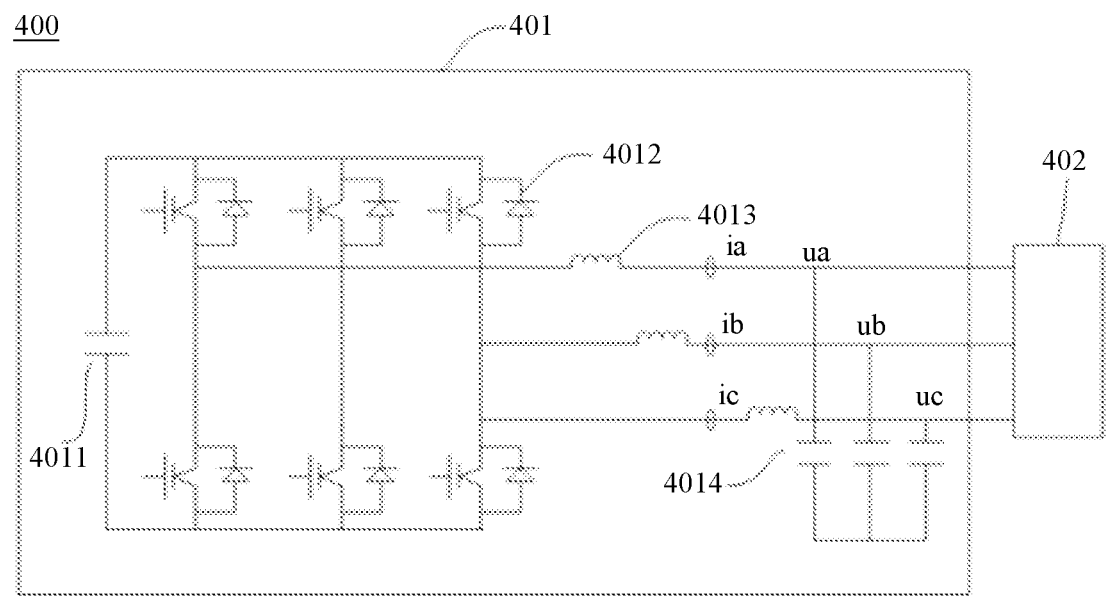
FIG. 4 is a schematic diagram of still another application scenario according to an embodiment of this application.

FIG. 4 is a schematic diagram of a three-phase voltage source inverter circuit 400. The three-phase voltage source inverter circuit 400 includes a voltage-type inverter 401 and a load 402. The voltage-type inverter 401 is connected to the load 402, to supply a three-phase alternating current voltage to the load 402. The voltage-type inverter 401 includes a bus capacitor 4011, a bidirectional power tube 4012, a filter inductor 4013, and a filter capacitor 4014. The bus capacitor 4011 is connected to one end of the bidirectional power tube 4012, the other end of the bidirectional power tube 4012 is connected to one end of the filter inductor 4013, and the other end of the filter inductor 4013 is connected to the filter capacitor 4014.

It should be understood that, the inverter serves as a voltage source to supply a voltage to the load, and a high-quality voltage waveform and a high response speed are key to power supply. Currently, an output voltage may be controlled in the following two manners.

In a first implementation, an outer voltage loop and an inner current loop are connected in series, to implement dual control on a voltage and a current, and finally, to supply power to the load by using the inverter. However, when the voltage loop and the current loop are connected in series, because the two loops affect each other, a parameter design of the current loop and the voltage loop is complex, thereby affecting stability of a system, and bandwidth of the voltage loop is limited due to addition of the current loop, thereby affecting a response speed of the system.

In a second implementation, a single voltage loop is used to control a voltage, and finally, to supply power to the load by using the inverter. However, the designed single voltage loop cannot effectively control a current, and there is an overcurrent risk.

In view of this, this application provides a voltage control method, an inverter, and a voltage control apparatus. The voltage loop and the double current loop run in parallel, and the current loop is used to dynamically limit amplitude of the voltage loop, so that the current loop controls a current and the voltage loop controls an output voltage, to help improve stability and a response speed of a system.

Before a method and an apparatus provided in embodiments of this application are described, the following points are first described.

First, in embodiments shown below, the terms and English abbreviations are all examples given for ease of description, and should not constitute any limitation on this application. This application does not exclude a possibility of defining another term that can implement a same or similar function in an existing or a future protocol.

Second, the terms "first", "second", and various numbers in the following embodiments are merely used for differentiation for ease of description, and are not used to limit the scope of embodiments of this application. For example, a first duty cycle and a second duty cycle are used to distinguish between different duty cycles.

Third, "at least one" indicates one or more, and "a plurality of" indicates two or more. "And/or" describes an association relationship between associated objects, and indicates that three relationships may exist. For example, A and/or B may indicate the following cases: A exists alone, both A and B exist, and B exists alone, where A and B may be singular or plural. The character "|" generally indicates an "or" relationship between the associated objects. "At least one of the following items (pieces)" or a similar expression thereof means any combination of these items, including any combination of singular items (pieces) or plural items (pieces). For example, at least one of a, b, and c may indicate a, b, c, a and b, a and c, b and c, or a, b, and c, where a, b, or c may be singular or plural.

To make objectives and technical solutions of this application clearer and more intuitive, the following describes in detail a voltage control method, an inverter, and a voltage control apparatus that are provided in this application with reference to the accompanying drawings and embodiments. It should be understood that specific embodiments described herein are merely used to explain this application but are not intended to limit this application.

It should be understood that a method in embodiments of this application may be performed by a control device or a processing device that can perform voltage control. The following describes embodiments of this application by using an inverter as an example.

Figure 5:
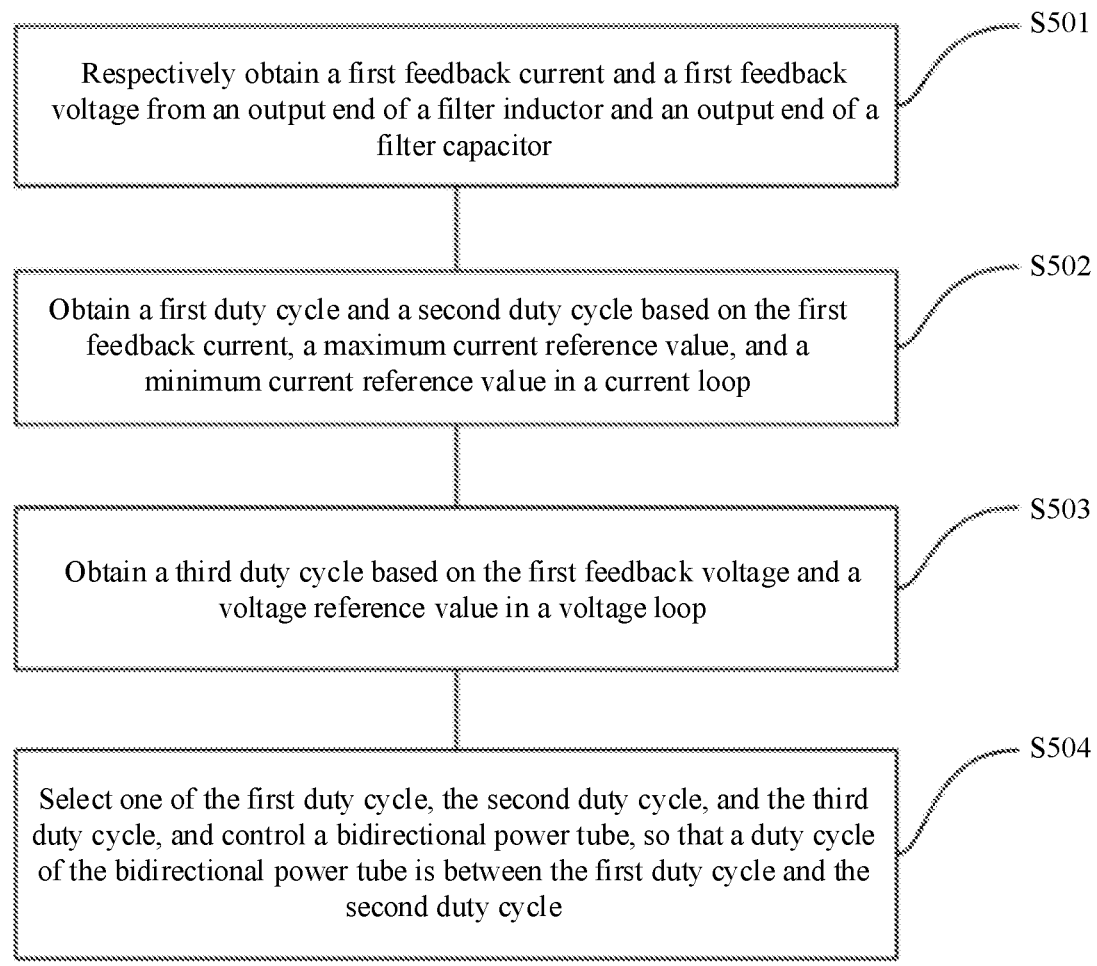
FIG. 5 is a schematic flowchart of a voltage control method according to an embodiment of this application.

FIG. 5 is a schematic flowchart of a voltage control method 500 according to an embodiment of this application. The method 500 may be applied to the voltage source inverter circuit 100 shown in FIG. 1, the single-phase voltage source inverter circuit 300 shown in FIG. 3, or the three-phase voltage source inverter circuit 400 shown in FIG. 4, or may be applied to another circuit. This is not limited in this embodiment of this application. As shown in FIG. 5, the method 500 may include the following steps.

S501: Respectively obtain a first feedback current and a first feedback voltage from an output end of a filter inductor and an output end of a filter capacitor.

In a possible implementation, an inverter may obtain the first feedback current by using a current sensor, and obtain the first feedback voltage by using a voltage sensor.

S502: Obtain a first duty cycle and a second duty cycle based on the first feedback current, a maximum current reference value, and a minimum current reference value in a current loop.

It should be understood that, because the first duty cycle and the second duty cycle are determined in the current loop, the first duty cycle and the second duty cycle may also be respectively referred to as a first current duty cycle and a second current duty cycle. This is not limited in this embodiment of this application.

Optionally, the inverter may obtain the first duty cycle based on the first feedback current and the maximum current reference value. The inverter may obtain the second duty cycle based on the first feedback current and the minimum current reference value. Therefore, the first duty cycle may be referred to as a duty cycle of an upper limit of a current, and the second duty cycle may be referred to as a duty cycle of a lower limit of a current.

S503: Obtain a third duty cycle based on the first feedback voltage and a voltage reference value in a voltage loop.

It should be understood that, because the third duty cycle is determined in the voltage loop, the third duty cycle may also be referred to as a voltage duty cycle. This is not limited in this embodiment of this application.

S504: Select one of the first duty cycle, the second duty cycle, and the third duty cycle, and control a bidirectional power tube, so that a duty cycle of the bidirectional power tube is between the first duty cycle and the second duty cycle.

Optionally, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

In this embodiment of this application, it can be understood that the first duty cycle and the second duty cycle are an upper limit and a lower limit of the duty cycle of the bidirectional power tube. When the third duty cycle does not exceed the upper limit and the lower limit of the duty cycle of the bidirectional power tube, the duty cycle of the bidirectional power tube may be the third duty cycle, namely, a duty cycle corresponding to the voltage loop. When the third duty cycle exceeds the upper limit and the lower limit, the duty cycle of the bidirectional power tube may be the upper limit or the lower limit, namely, a duty cycle corresponding to the current loop. Therefore, a process in which the current loop is used to limit amplitude of the voltage loop is implemented.

In this embodiment of this application, the inverter controls, based on the maximum current reference value and the minimum current reference value, a current by using the current loop, to prevent the current from being out of control and avoid an overcurrent risk. The voltage loop and a double current loop run in parallel, and the current loop is used to dynamically limit amplitude of the voltage loop, to make a delay shorter than a delay in running of the voltage loop and the current loop in series. In addition, it is easier to separately design parameters of the current loop and the voltage loop, to help improve stability and a response speed of a system.

Figure 6:
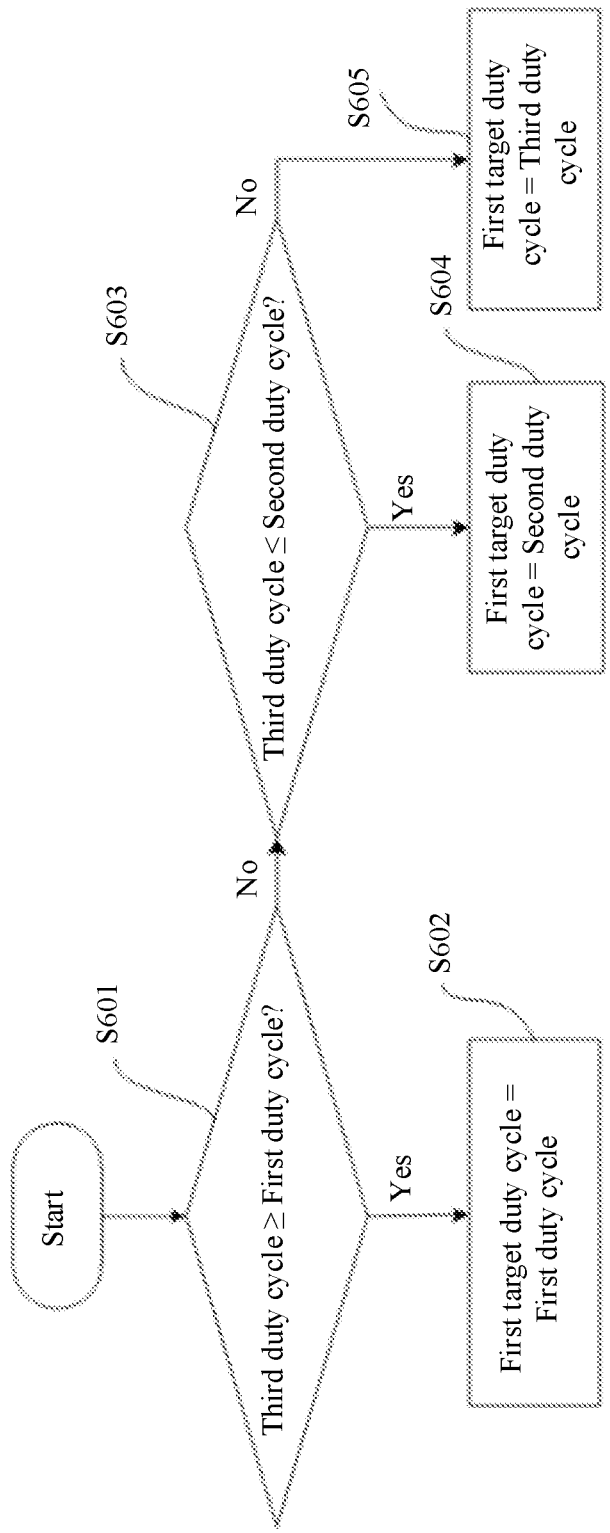
FIG. 6 is a schematic flowchart of determining a first target duty cycle according to an embodiment of this application.

FIG. 6 shows a specific procedure of a method for determining a first target duty cycle according to an embodiment of this application. As shown in FIG. 6, the method includes the following steps.

S601: The inverter determines whether the third duty cycle is greater than or equal to the first duty cycle.

S602: If the third duty cycle is greater than or equal to the first duty cycle, the inverter determines the first duty cycle as the first target duty cycle.

S603: If the third duty cycle is less than the first duty cycle, the inverter determines whether the third duty cycle is less than or equal to the second duty cycle.

S604: If the third duty cycle is less than or equal to the second duty cycle, the inverter determines the second duty cycle as the first target duty cycle.

S605: If the third duty cycle is greater than the second duty cycle, the inverter determines the third duty cycle as the first target duty cycle.

In this embodiment of this application, the inverter dynamically limits amplitude of the voltage loop by using the current loop. To be specific, the inverter limits amplitude of a third duty cycle of an output of the voltage loop by using the current loop. Because there is a deviation in an input of the voltage loop, integral adjustment of the voltage loop is accumulated, so that the system eliminates the deviation, to reduce a degree of deviation. Until the deviation disappears, the integral adjustment stops, and a value without a deviation is output. However, in this embodiment of this application, because amplitude of the output of the voltage loop is limited by using the current loop, regardless of whether integration is performed, a final output of the voltage loop is any case in S602, S604, or S605. Therefore, an integration action of the voltage loop does not need to be further accumulated, to reduce time consumed through integration, and further help improve the response speed of the system.

It should be understood that the voltage control method provided in this embodiment of this application may be applied to a stationary coordinate system, or may be applied to a rotating coordinate system. This is not limited in this embodiment of this application.

The following describes in detail a case in which the voltage control method provided in this embodiment of this application is applied to the rotating coordinate system.

In an optional embodiment, the first feedback current and the first feedback voltage are obtained in the stationary coordinate system. S502 of obtaining a first duty cycle and a second duty cycle based on the first feedback current, a maximum current reference value, and a minimum current reference value in a current loop includes: performing coordinate conversion on the first feedback current, to obtain a second feedback current in the rotating coordinate system; and obtaining the first duty cycle and the second duty cycle based on the second feedback current, the maximum current reference value, and the minimum current reference value in the current loop.

S503 of obtaining a third duty cycle based on the first feedback voltage and a voltage reference value in a voltage loop includes: performing coordinate conversion on the first feedback voltage, to obtain a second feedback voltage in the rotating coordinate system; and obtaining the third duty cycle based on the second feedback voltage and the voltage reference value in the voltage loop.

S504 of selecting one of the first duty cycle, the second duty cycle, and the third duty cycle, and controlling a bidirectional power tube, so that a duty cycle of the bidirectional power tube is between the first duty cycle and the second duty cycle includes: performing coordinate conversion on the duty cycle of the bidirectional power tube, namely, the first target duty cycle, to obtain a second target duty cycle in the stationary coordinate system; controlling the bidirectional power tube based on the second target duty cycle, to supply power to the load.

Therefore, in this embodiment of this application, the inverter may select one of the first duty cycle, the second duty cycle, and the third duty cycle in the rotating coordinate system, to obtain the duty cycle of the bidirectional power tube. In other words, the inverter limits amplitude of the voltage loop by using the current loop in the rotating coordinate system, to obtain the duty cycle of the bidirectional power tube.

In an optional embodiment, the current loop includes a first current loop and a second current loop; and the obtaining the first duty cycle and the second duty cycle based on the second feedback current, the maximum current reference value, and the minimum current reference value in the current loop includes: obtaining the first duty cycle based on the second feedback current and the maximum current reference value in the first current loop; and obtaining the second duty cycle based on the second feedback current and the minimum current reference value in the second current loop.

In an optional embodiment, the obtaining a third duty cycle based on the first feedback voltage and a voltage reference value in a voltage loop includes: determining, as a new voltage reference value, a value obtained by subtracting a product of the first feedback current and a preset coefficient from the voltage reference value; and obtaining the third duty cycle based on the first feedback voltage and the new voltage reference value.

The three-phase inverter circuit shown in FIG. 4 is used as an example, to describe this embodiment of this application with reference to FIG. 7(a) and FIG. 7(b) to FIG. 10.

The inverter may obtain first feedback currents ia_feed, ib_feed, and ic_feed at sampling points ia, ib, and ic in FIG. 4 by using the current sensor, and obtain first feedback voltages ua_feed, ub_feed, and uc_feed at sampling points ua, ub, and uc in FIG. 4 by using the voltage sensor.

Figure 7A:
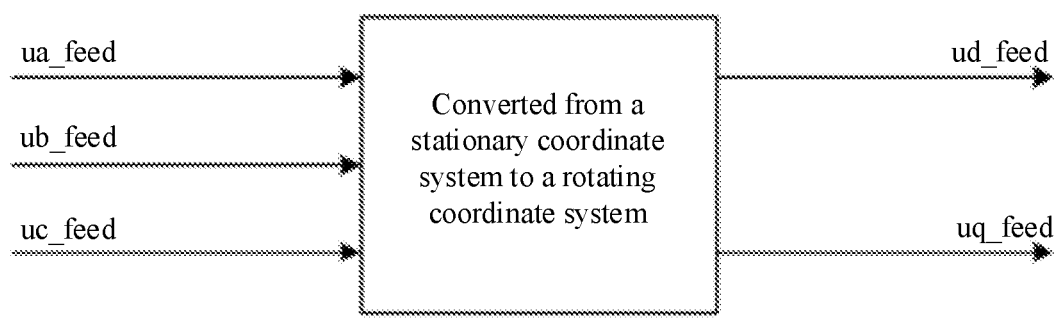
FIG. 7(a) and FIG. 7(b) are a schematic diagram of coordinate system conversion according to an embodiment of this application.
Figure 7B:
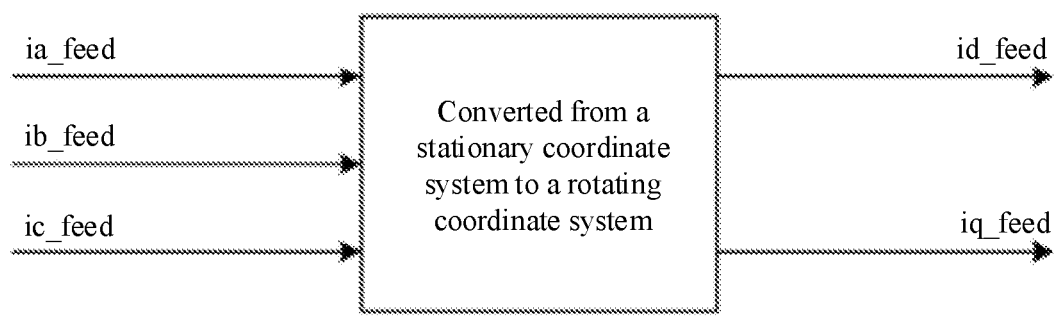

FIG. 7(a) and FIG. 7(b) are a schematic diagram of coordinate system conversion according to an embodiment of this application. As shown in FIG. 7(a), the inverter may convert the first feedback currents ia_feed, ib_feed, and ic_feed from the stationary coordinate system to the rotating coordinate system, to obtain second feedback currents id_feed and iq_feed. As shown in FIG. 7(b), the inverter may convert the first feedback voltages ua_feed, ub_feed, and uc_feed from the stationary coordinate system to the rotating coordinate system, to obtain second feedback voltages ud_feed and uq_feed.

Figure 8:
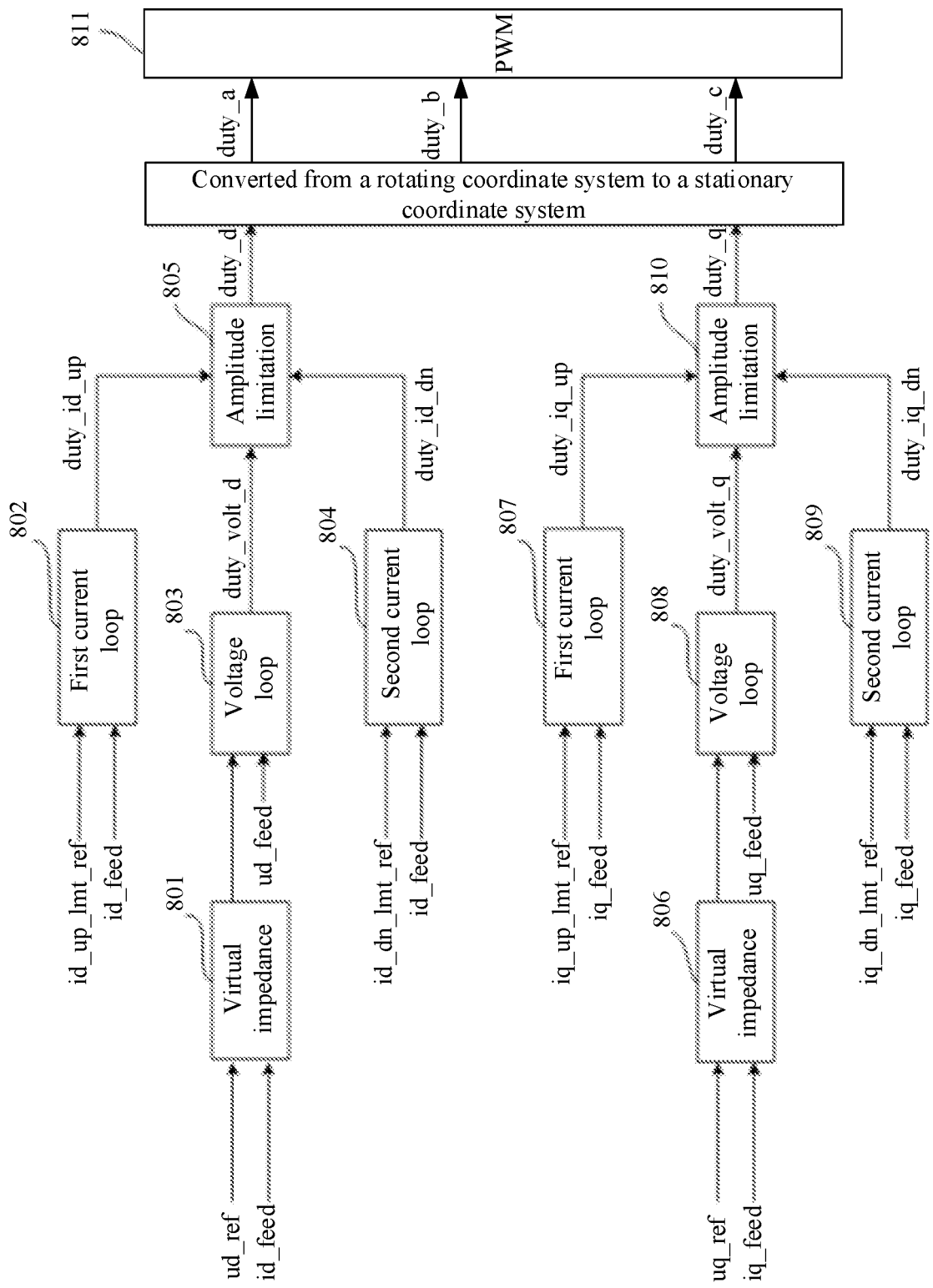
FIG. 8 is a schematic flowchart of determining a first duty cycle, a second duty cycle, and a third duty cycle according to an embodiment of this application.

FIG. 8 is a schematic flowchart of determining a first duty cycle, a second duty cycle, and a third duty cycle according to an embodiment of this application. It should be understood that the rotating coordinate system includes a coordinate axis d and a coordinate axis q. Therefore, the following separately describes the coordinate axis d and the coordinate axis q.

As shown in FIG. 8, the current loop includes a first current loop 802 and a second current loop 804 on the coordinate axis d of the rotating coordinate system. In the first current loop 802, the inverter obtains a first duty cycle duty_id_up based on the second feedback current id_feed and a maximum current reference value id_up_lmt_ref. In the second current loop 804, the inverter obtains a second duty cycle duty_id_n based on the second feedback current id_feed and a minimum current reference value id_do_lmt_ref. The inverter determines, in virtual impedance 801 as a new reference voltage ud_ref, a value obtained by subtracting a product of the second feedback current id_feed and the preset coefficient from a voltage reference value ud_ref. In a voltage loop 803, the inverter obtains a third duty cycle duty_volt_d based on the second feedback voltage ud_feed and the new reference voltage ud_ref. In 805, the inverter may limit amplitude of the third duty cycle duty_volt_d based on the first duty cycle duty_id_up and the second duty cycle duty_id_dn, to obtain a first target duty cycle duty_d.

Figure 9:
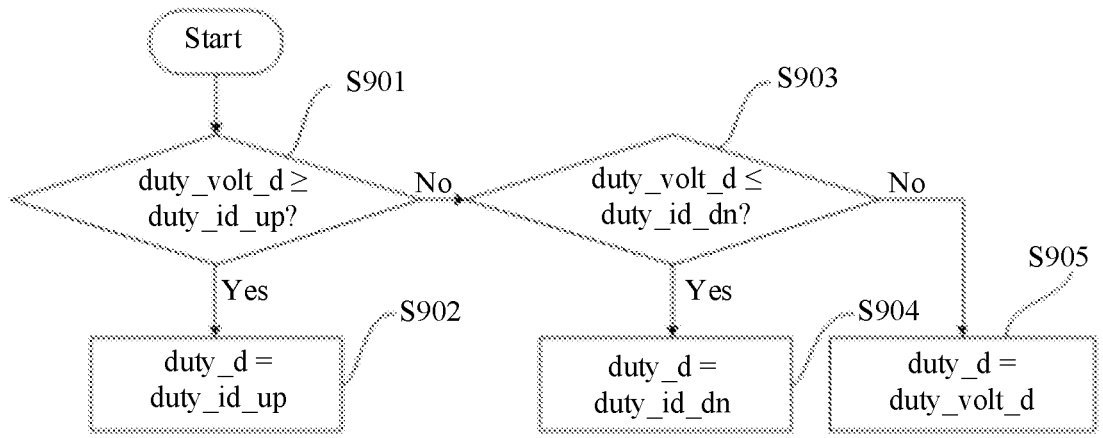
FIG. 9 is a schematic flowchart of dynamically limiting amplitude of a voltage loop by using a current loop on a coordinate axis d of a rotating coordinate system according to an embodiment of this application.

FIG. 9 shows a specific procedure in which a current loop is used to dynamically limit amplitude of a voltage loop on a coordinate axis d of a rotating coordinate system according to an embodiment of this application. As shown in FIG. 9, specific steps are as follows:

S901: The inverter determines whether the third duty cycle duty_volt_d is greater than or equal to the first duty cycle duty_id_up.

S902: If the third duty cycle duty_volt_d is greater than or equal to the first duty cycle duty_id_up, the inverter determines the first duty cycle duty_id_up as the first target duty cycle duty_d.

S903: If the third duty cycle duty_volt_d is less than the first duty cycle duty_id_up, the inverter determines whether the third duty cycle duty_volt_d is less than or equal to the second duty cycle duty_id_dn.

S904: If the third duty cycle duty_volt_d is less than or equal to the second duty cycle duty_id_dn, the inverter determines the second duty cycle duty_id_dn as the first target duty cycle duty_d.

S905: If the third duty cycle duty_volt_d is greater than the second duty cycle duty_id_dn, the inverter determines the third duty cycle duty_volt_d as the first target duty cycle duty_d.

The current loop includes a first current loop 807 and a second current loop 809 on the coordinate axis q of the rotating coordinate system. In the first current loop 807, the inverter obtains a first duty cycle duty_iq_up based on a second feedback current iq_feed and a maximum current reference value iq_up_lmt_ref. In the second current loop 809, the inverter obtains a second duty cycle duty_iq_dn based on a second feedback current iq_feed and a minimum current reference value iq_dn_lmt_ref. The inverter determines, in virtual impedance 806 as a new reference voltage uq_ref, a value obtained by subtracting a product of the second feedback current iq_feed and the preset coefficient from a reference voltage uq_ref. In a voltage loop 808, the inverter obtains a third duty cycle duty_volt_q based on a second feedback voltage uq_feed and the new reference voltage uq_ref. In 810, the inverter may limit amplitude of the third duty cycle duty_volt_q based on the first duty cycle duty_iq_up and the second duty cycle duty_iq_dn, to obtain a first target duty cycle duty_q.

Figure 10:
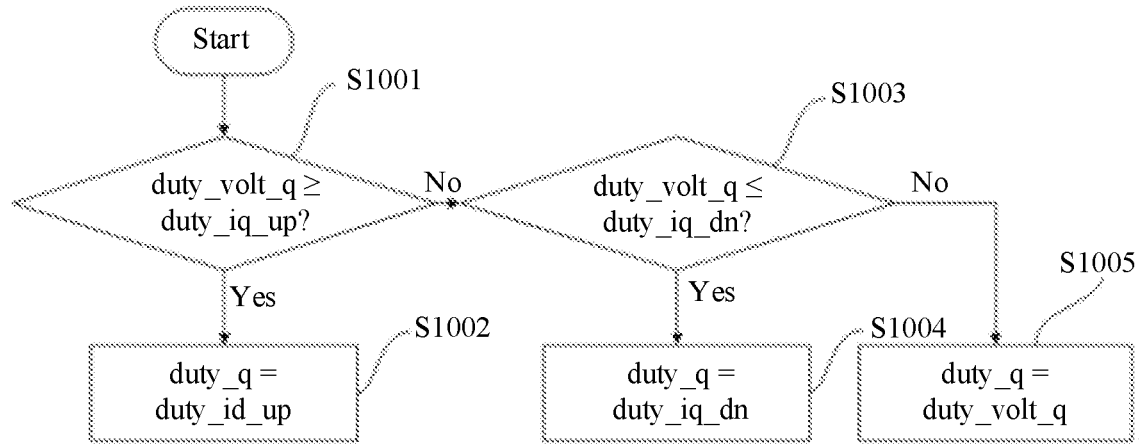
FIG. 10 is a schematic flowchart of dynamically limiting amplitude of a voltage loop by using a current loop on a coordinate axis q of a rotating coordinate system according to an embodiment of this application.

FIG. 10 shows a specific procedure in which a current loop is used to dynamically limit amplitude of a voltage loop on a coordinate axis q of a rotating coordinate system according to an embodiment of this application. As shown in FIG. 10, specific steps are as follows:

S1001: The inverter determines whether the third duty cycle duty_volt_q is greater than or equal to the first duty cycle duty_iq_up.

S1002: If the third duty cycle duty_volt_q is greater than or equal to the first duty cycle duty_iq_up, the inverter determines the first duty cycle duty_iq_up as the first target duty cycle duty_q.

S1003: If the third duty cycle duty_volt_q is less than the first duty cycle duty_iq_up, the inverter determines whether the third duty cycle duty_volt_q is less than or equal to the second duty cycle duty_iq_dn.

S1004: If the third duty cycle duty_volt_q is less than or equal to the second duty cycle duty_iq_dn, the inverter determines the second duty cycle duty_iq_dn as the first target duty cycle duty_q.

S1005: If the third duty cycle duty_volt_q is greater than the second duty cycle duty_iq_dn, the inverter determines the third duty cycle duty_volt_q as the first target duty cycle duty_q.

After the first target duty cycles duty_d and duty_q are obtained, as shown in FIG. 8, the inverter may convert the first target duty cycles duty_d and duty_q from the rotating coordinate system to the stationary coordinate system, to obtain second target duty cycles duty_a, duty_b, and duty_c in the stationary coordinate system. Based on the second target duty cycle, the inverter controls the bidirectional power tube through pulse width modulation (PWM), to supply power to the load.

Figure 11A:
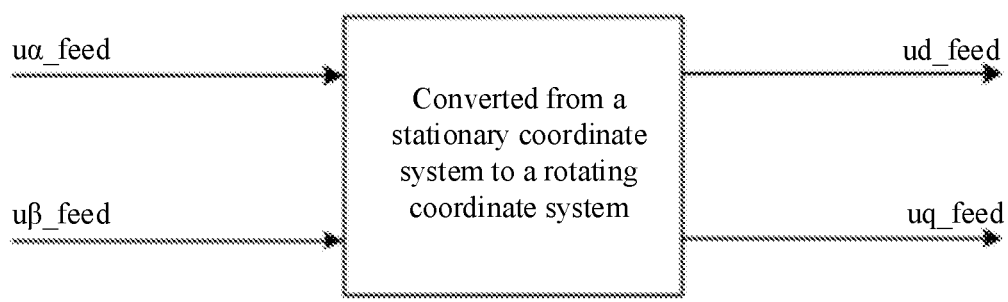
FIG. 11(a) and FIG. 11(b) are a schematic diagram of other coordinate system conversion according to an embodiment of this application.
Figure 11B:
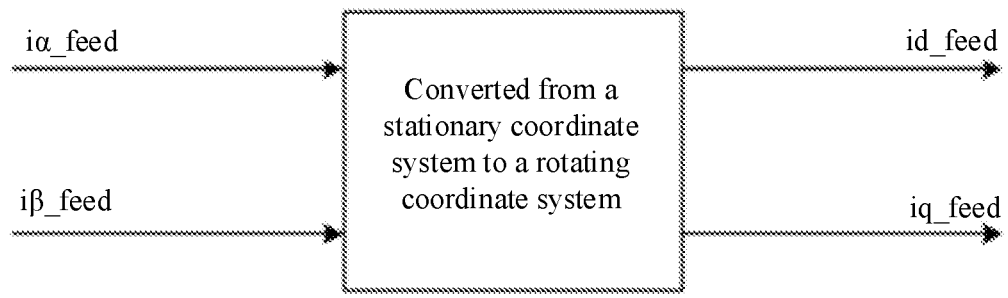

The single-phase inverter circuit shown in FIG. 3 is used as an example, to describe this embodiment of this application with reference to FIG. 8 to FIG. 11(*a*) and FIG. 11(*b*).

The inverter may obtain, at a sampling point ia in FIG. 3 by using the current sensor, a feedback current ia_feed on an axis a of the stationary coordinate system, and use the feedback current ia_feed on the axis a of the stationary coordinate system as a first feedback current iα_feed on an axis α of the stationary coordinate system. The first feedback current iα_feed lags by 90 degrees, to obtain a first feedback current iβ_feed on an axis β of the stationary coordinate system. The inverter may obtain, at a sampling point ua in FIG. 3 by using the voltage sensor, a feedback voltage ua_feed on the axis a of the stationary coordinate system, and use the feedback voltage uα_feed on the axis a of the stationary coordinate system as a first feedback voltage uα_feed on the axis α of the stationary coordinate system. The first feedback voltage uα_feed lags by 90 degrees, to obtain a first feedback voltage uβ_feed on the axis β of the stationary coordinate system.

FIG. 11(*a*) and FIG. 11(*b*) are a schematic diagram of coordinate system conversion according to an embodiment of this application. As shown in FIG. 11(*a*), the inverter may convert the first feedback currents iα_feed and iβ_feed from the stationary coordinate system to the rotating coordinate system, to obtain second feedback currents id_feed and iq_feed. As shown in FIG. 11(*b*), the inverter may convert the first feedback voltages uα_feed and uβ_feed from the stationary coordinate system to the rotating coordinate system, to obtain second feedback voltages ud_feed and uq_feed.

Same as FIG. 8 to FIG. 10, the inverter may obtain first target duty cycles duty_d and duty_q in the rotating coordinate system based on the second feedback currents id_feed and iq_feed and the second feedback voltages ud_feed and uq_feed. The inverter may convert the first target duty cycles duty_d and duty_q from the rotating coordinate system to the stationary coordinate system, to obtain a second target duty cycle duty_a in the stationary coordinate system. Based on the second target duty cycle duty_a, the inverter may control the bidirectional power tube through pulse width modulation (pulse width modulation, PWM), to supply power to the load. To avoid repetition, details are not described herein again.

The following describes in detail a case in which the voltage control method provided in this embodiment of this application is applied to the stationary coordinate system.

The three-phase inverter circuit shown in FIG. 4 is used as an example, to describe this embodiment of this application with reference to FIG. 12 to FIG. 15.

The inverter may obtain first feedback currents ia_feed, ib_feed, and ic_feed at sampling points ia, ib, and ic_in FIG. 4 by using the current sensor, and obtain first feedback voltages ua_feed, ub_feed, and uc_feed at sampling points ua, ub, and uc in FIG. 3 by using the voltage sensor. The first feedback currents and the first feedback voltages are obtained in the stationary coordinate system.

Figure 12:
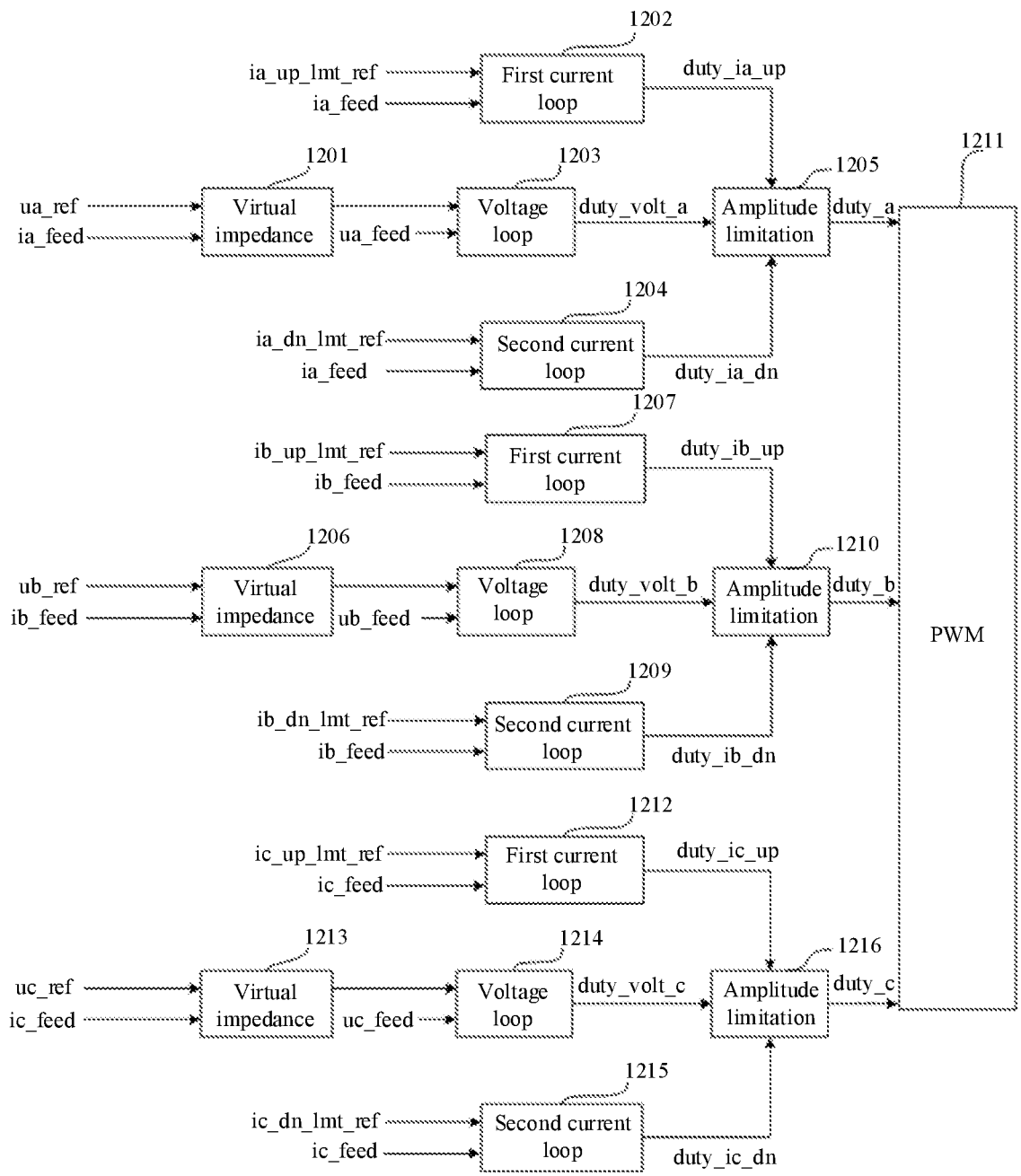
FIG. 12 is another schematic flowchart of determining a first duty cycle, a second duty cycle, and a third duty cycle according to an embodiment of this application.

FIG. 12 is a schematic flowchart of determining a first duty cycle, a second duty cycle, and a third duty cycle according to an embodiment of this application. As shown in FIG. 12, after the first feedback currents ia_feed, ib_feed, and ic_feed in the stationary coordinate system and the first feedback voltages ua_feed, ub_feed, and uc_feed in the stationary coordinate system are obtained, the current loop includes a first current loop 1202 and a second current loop 1204 on a coordinate axis a of the stationary coordinate system. In the first current loop 1202, the inverter obtains a first duty cycle duty_ia_up based on the feedback current ia_feed and a maximum current reference value ia_up_lmt_ref. In the second current loop 1204, the inverter obtains a second duty cycle duty_ia_dn based on the first feedback current ia_feed and a minimum current reference value ia_dn_lmt_ref. The inverter may determine, in virtual impedance 1201 as a new reference voltage ua_ref, a value obtained by subtracting a product of the first feedback current ia_feed and the preset coefficient from a reference voltage ua_ref. In the voltage loop 1203, a third duty cycle duty_volt_a is obtained based on the first feedback voltage ua_feed and the new reference voltage ua_ref. In 1205, the inverter may limit amplitude of the third duty cycle duty_volt_a based on the first duty cycle duty_ia_up and the second duty cycle duty_ia_dn, to obtain a first target duty cycle duty_a.

Figure 13:
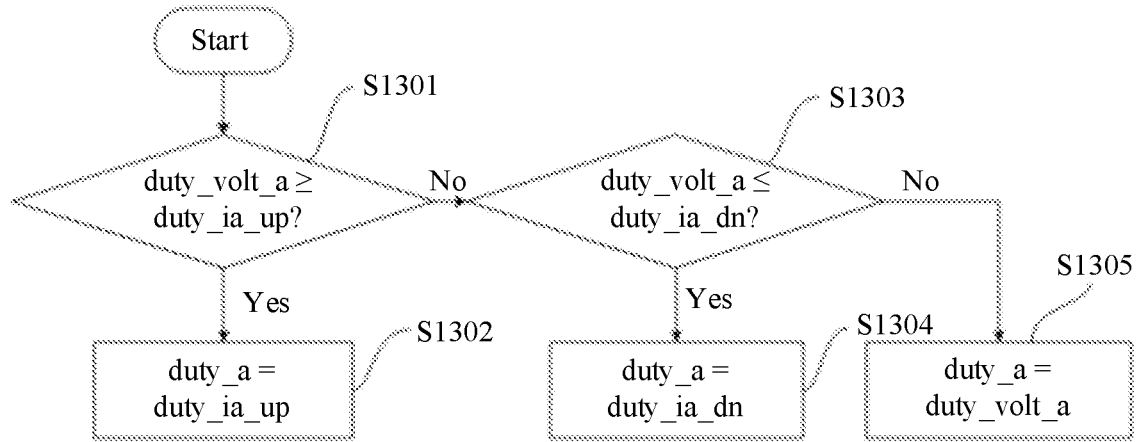
FIG. 13 is a schematic flowchart of dynamically limiting amplitude of a voltage loop by using a current loop on a coordinate axis a in a stationary coordinate system according to an embodiment of this application.

FIG. 13 shows a specific procedure in which a current loop is used to dynamically limit amplitude of a voltage loop on a coordinate axis a of a stationary coordinate system according to an embodiment of this application. As shown in FIG. 13, specific steps are as follows:

S1301: The inverter determines whether the third duty cycle duty_volt_a is greater than or equal to the first duty cycle duty_ia_up.

S1302: If the third duty cycle duty_volt_a is greater than or equal to the first duty cycle duty_ia_up, the inverter determines the first duty cycle duty_ia_up as the first target duty cycle duty_a.

S1303: If the third duty cycle duty_volt_a is less than the first duty cycle duty_ia_up, the inverter determines whether the third duty cycle duty_volt_a is less than or equal to the second duty cycle duty_ia_dn.

S1304: If the third duty cycle duty_volt_a is less than or equal to the second duty cycle duty_ia_dn, the inverter determines the second duty cycle duty_ia_dn as the first target duty cycle duty_a.

S1305: If the third duty cycle duty_volt_a is greater than the second duty cycle duty_ia_dn, the inverter determines the third duty cycle duty_volt_a as the first target duty cycle duty_a.

The current loop includes a first current loop 1207 and a second current loop 1209 on a coordinate axis b of the stationary coordinate system. In the first current loop 1207, the inverter may obtain a first duty cycle duty_ib_up based on a first feedback current ib_feed and a maximum current reference value ib_up_lmt_ref. In the second current loop 1209, the inverter obtains a second duty cycle duty_ib_dn based on a second feedback current ib_feed and a minimum current reference value ib_dn_lmt_ref. The inverter may determine, in virtual impedance 1206 as a new reference voltage ub_ref, a value obtained by subtracting a product of the first feedback current ib_feed and the preset coefficient from a reference voltage ub_ref. In a voltage loop 1208, a third duty cycle duty_volt_b is obtained based on a first feedback voltage ub_feed and the new reference voltage ub_ref. In 1210, the inverter may limit amplitude of the third duty cycle duty_volt_b based on the first duty cycle duty_ib_up and the second duty cycle duty_ib_dn, to obtain a first target duty cycle duty_b.

Figure 14:
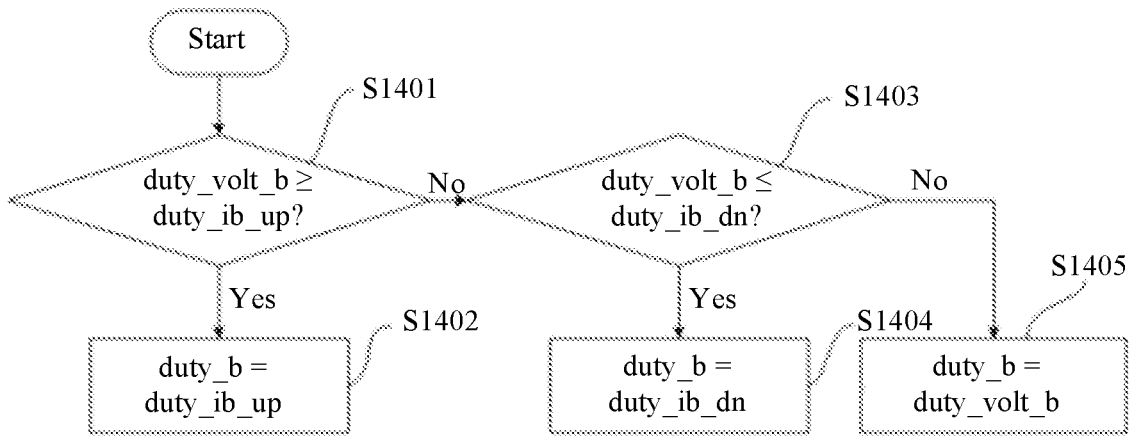
FIG. 14 is a schematic flowchart of dynamically limiting amplitude of a voltage loop by using a current loop on a coordinate axis b in a stationary coordinate system according to an embodiment of this application.

FIG. 14 shows a specific procedure in which a current loop is used to dynamically limit amplitude of a voltage loop on a coordinate axis b of a stationary coordinate system according to an embodiment of this application. As shown in FIG. 14, specific steps are as follows:

S1401: The inverter determines whether the third duty cycle duty_volt_b is greater than or equal to the first duty cycle duty_ib_up.

S1402: If the third duty cycle duty_volt_b is greater than or equal to the first duty cycle duty_ib_up, the inverter determines the first duty cycle duty_ib_up as the first target duty cycle duty_b.

S1403: If the third duty cycle duty_volt_b is less than the first duty cycle duty_ib_up, the inverter determines whether the third duty cycle duty_volt_b is less than or equal to the second duty cycle duty_ib_dn.

S1404: If the third duty cycle duty_volt_b is less than or equal to the second duty cycle duty_ib_dn, the inverter determines the second duty cycle duty_ib_dn as the first target duty cycle duty_b.

S1405: If the third duty cycle duty_volt_b is greater than the second duty cycle duty_ib_dn, the inverter determines the third duty cycle duty_volt_b as the first target duty cycle duty_b.

The current loop includes a first current loop 1212 and a second current loop 1215 on a coordinate axis c of the stationary coordinate system. In the first current loop 1212, the inverter may obtain a first duty cycle duty_ic_up based on a first feedback current ic_feed and a maximum current reference value ic_up_lmt_ref. In the second current loop 1215, the inverter obtains a second duty cycle duty_ic_dn based on a second feedback current ic_feed and a minimum current reference value ic_dn_lmt_ref. The inverter may determine, in virtual impedance 1213 as a new reference voltage uc_ref, a value obtained by subtracting a product of the first feedback current ic_feed and the preset coefficient from a reference voltage uc_ref. In a voltage loop 1214, a third duty cycle duty_volt_c is obtained based on a first feedback voltage uc_feed and the new reference voltage uc_ref. In 1216, the inverter may limit amplitude of the third duty cycle duty_volt_c based on the first duty cycle duty_ic_up and the second duty cycle duty_ic_dn, to obtain a first target duty cycle duty_c.

Figure 15:
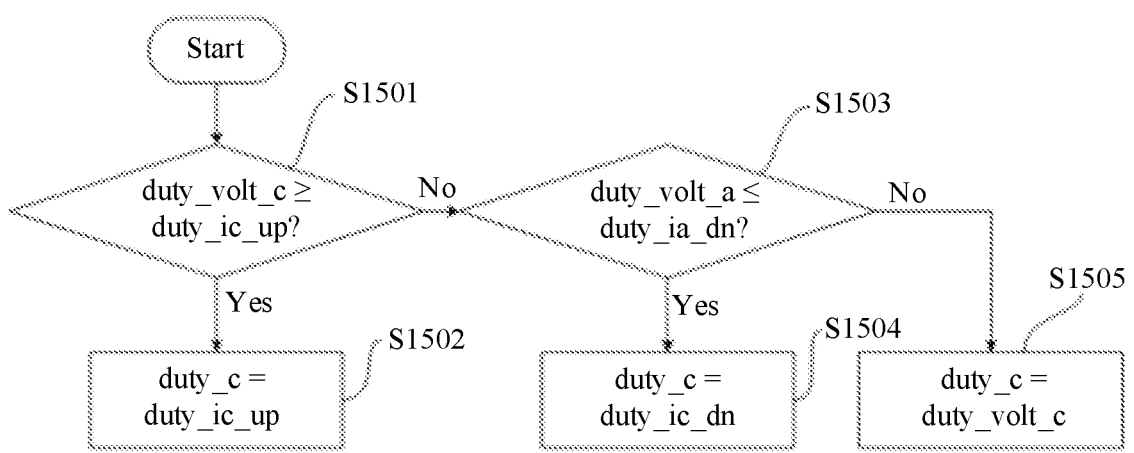
FIG. 15 is a schematic flowchart of dynamically limiting amplitude of a voltage loop by using a current loop on a coordinate axis c in a stationary coordinate system according to an embodiment of this application.

FIG. 15 shows a specific procedure in which a current loop is used to dynamically limit amplitude of a voltage loop on a coordinate axis c of a stationary coordinate system according to an embodiment of this application. As shown in FIG. 15, specific steps are as follows:

S1501: The inverter determines whether the third duty cycle duty_volt_c is greater than or equal to the first duty cycle duty_ic_up.

S1502: If the third duty cycle duty_volt_c is greater than or equal to the first duty cycle duty_ic_up, the inverter determines the first duty cycle duty_ic_up as the first target duty cycle duty_c.

S1503: If the third duty cycle duty_volt_c is less than the first duty cycle duty_ic_up, the inverter determines whether the third duty cycle duty_volt_c is less than or equal to the second duty cycle duty_ic_dn.

S1504: If the third duty cycle duty_volt_c is less than or equal to the second duty cycle duty_ic_dn, the inverter determines the second duty cycle duty_ic_dn as the first target duty cycle duty_c.

S1505: If the third duty cycle duty_volt_c is greater than the second duty cycle duty_ic_dn, the inverter determines the third duty cycle duty_volt_c as the first target duty cycle duty_c.

Based on the first target duty cycles duty_a, duty_b, and duty_c, the inverter controls the bidirectional power tube through PWM, to supply power to the load.

Figure 16:
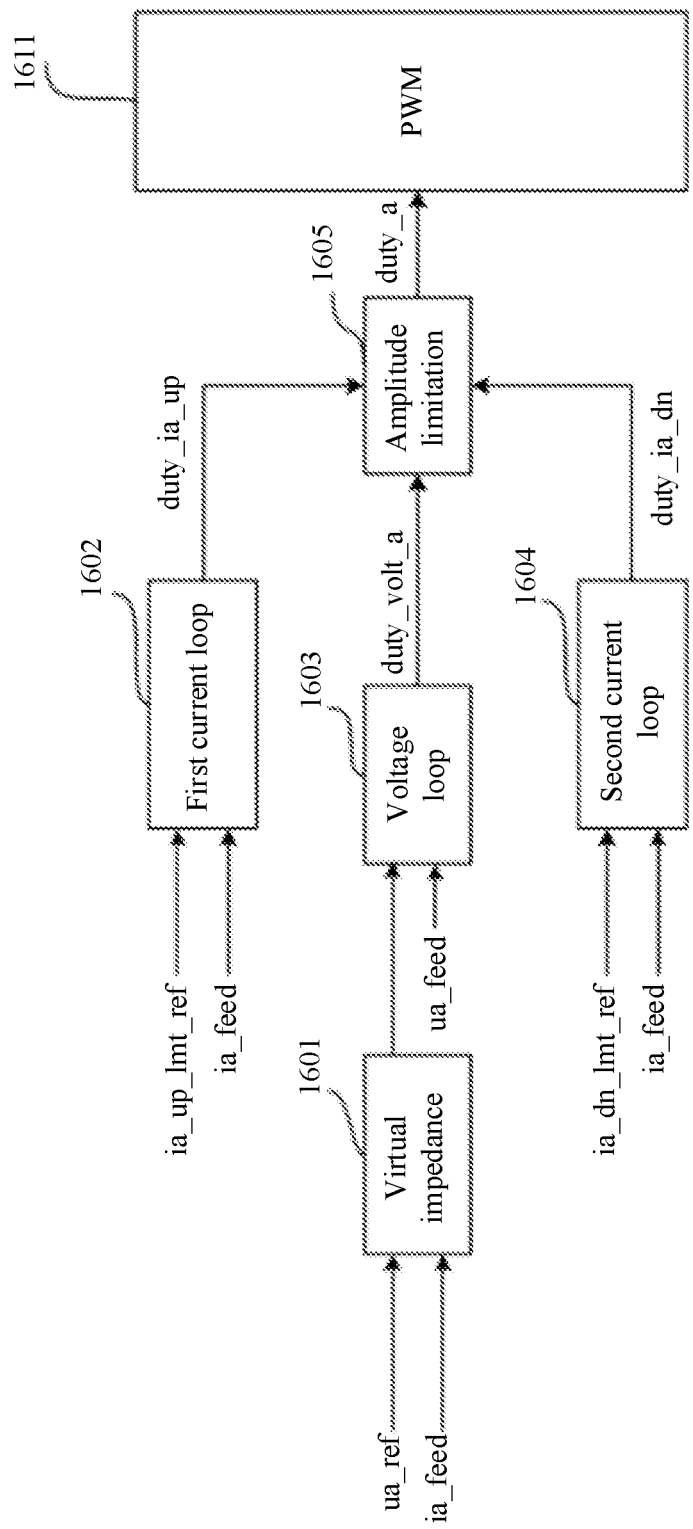
FIG. 16 is still another schematic flowchart of determining a first duty cycle, a second duty cycle, and a third duty cycle according to an embodiment of this application.

The single-phase inverter circuit shown in FIG. 3 is used as an example, to describe this embodiment of this application with reference to FIG. 13 and FIG. 16.

Based on the foregoing obtained feedback current ia_feed and feedback voltage ua_feed, the inverter may obtain the first duty cycle duty_ia_up, the second duty cycle duty_ia_dn, and the third duty cycle duty_volt_a on the coordinate axis a of the stationary coordinate system based on a schematic flowchart, in FIG. 16, of determining a first duty cycle, a second duty cycle, and a third duty cycle according to an embodiment of this application.

Based on the obtained first duty cycle, the second duty cycle, and the third duty cycle, the inverter may obtain the first target duty cycle duty_a based on the specific procedure, in FIG. 13, in which a current loop is used to dynamically limit amplitude of the voltage loop on the coordinate axis a of the stationary coordinate system according to an embodiment of this application. The inverter controls the bidirectional power tube through PWM based on the first target duty cycle duty_a, to supply power to the load. To avoid repetition, details are not described herein again.

In this embodiment of this application, the inverter controls a current by using the current loop, and controls a voltage by using the voltage loop. The voltage loop and a double current loop run in parallel, and the current loop is used to dynamically limit amplitude of the voltage loop, to make a delay shorter than a delay in running of the voltage loop and the current loop in series. In addition, it is easier to separately design parameters of the current loop and the voltage loop, to help improve the stability and the response speed of the system.

It should be understood that, sequence numbers of the foregoing processes do not mean execution sequences. The execution sequences of the processes should be determined based on functions and internal logic of the processes, and should not be construed as any limitation on the implementation processes of embodiments of this application.

The foregoing describes in detail a voltage control method provided in embodiments of this application with reference to FIG. 1 to FIG. 16. The following describes in detail an inverter and a voltage control apparatus provided in embodiments of this application with reference to FIG. 17 to FIG. 19.

Figure 17:
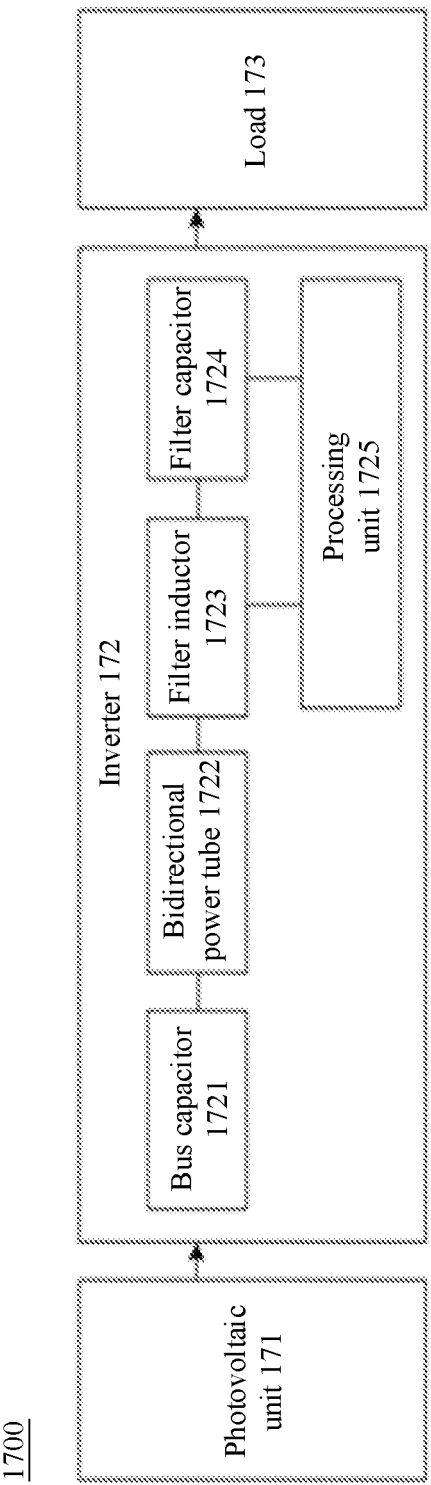
FIG. 17 is a schematic block diagram of an inverter according to an embodiment of this application.

FIG. 17 shows an inverter 1700 according to an embodiment of this application. The inverter 1700 includes a bus capacitor 1721, a bidirectional power tube 1722, a filter inductor 1723, a filter capacitor 1724, and a processing unit 1725. The bus capacitor 1721 is connected to one end of the bidirectional power tube 1722, the other end of the bidirectional power tube 1722 is connected to one end of the filter inductor 1723, the other end of the filter inductor 1723 is connected to the filter capacitor 1724, and the filter inductor 1723 and the filter capacitor 1724 and the processing unit 1725 are connected.

The processing unit 1725 is configured to: respectively obtain a first feedback current and a first feedback voltage from an output end of the filter inductor and an output end of the filter capacitor; obtain a first duty cycle and a second duty cycle based on the first feedback current, a maximum current reference value, and a minimum current reference value; obtain a third duty cycle based on the first feedback voltage and a voltage reference value in a voltage loop; and select one of the first duty cycle, the second duty cycle, and the third duty cycle, and control the bidirectional power tube, so that a duty cycle of the bidirectional power tube is between the first duty cycle and the second duty cycle.

Optionally, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

Optionally, the first feedback current and the first feedback voltage are obtained in a stationary coordinate system; and the processing unit 1725 is specifically configured to: perform coordinate conversion on the first feedback current, to obtain a second feedback current in a rotating coordinate system; obtain the first duty cycle and the second duty cycle based on the second feedback current, the maximum current reference value, and the minimum current reference value in the current loop; perform coordinate conversion on the first feedback voltage, to obtain a second feedback voltage in the rotating coordinate system; obtain the third duty cycle based on the second feedback voltage and the voltage reference value in the voltage loop; select one of the first duty cycle, the second duty cycle, and the third duty cycle as a first target duty cycle; and perform coordinate conversion on the first target duty cycle, to obtain a second target duty cycle in the stationary coordinate system, and control the bidirectional power tube, so that the duty cycle of the bidirectional power tube is between the first duty cycle and the second duty cycle.

Optionally, the current loop includes a first current loop and a second current loop; and the processing unit 1725 is configured to: obtain the first duty cycle based on the second feedback current and the maximum current reference value in the first current loop; and obtain the second duty cycle based on the second feedback current and the minimum current reference value in the second current loop.

Optionally, the processing unit 1725 is configured to: determine, as a new voltage reference value, a value obtained by subtracting a product of the first feedback current and a preset coefficient from the voltage reference value; and obtain the third duty cycle based on the first feedback voltage and the new voltage reference value.

Optionally, an upstream of the bus capacitor includes at least one of the following: an energy storage device, a photovoltaic device, or a wind power device.

It should be understood that the inverter 1700 herein may be specifically the inverter in the foregoing embodiment, and the inverter 1700 may be configured to perform procedures and/or steps of the inverter in the foregoing method embodiment. To avoid repetition, details are not described herein again.

Figure 18:
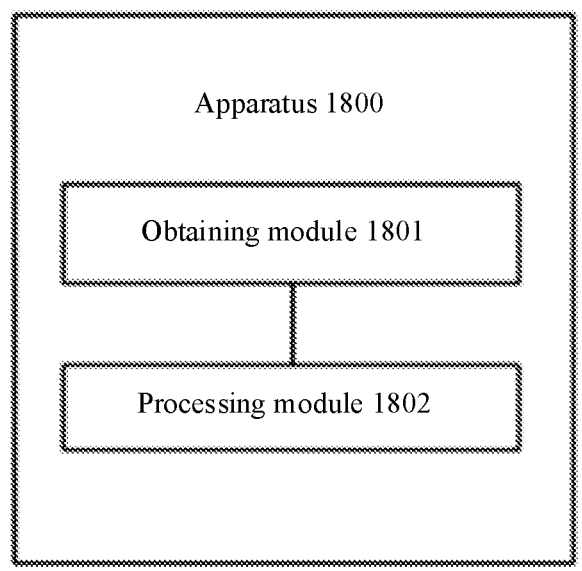
FIG. 18 is a schematic block diagram of a voltage control apparatus according to an embodiment of this application.

FIG. 18 shows a voltage control apparatus 1800 according to an embodiment of this application. The voltage control apparatus 1800 is applied to a voltage source inverter. The voltage source inverter includes a bus capacitor, a bidirectional power tube, a filter inductor, and a filter capacitor, the bus capacitor is connected to one end of the bidirectional power tube, the other end of the bidirectional power tube is connected to one end of the filter inductor, the other end of the filter inductor is connected to the filter capacitor, and the apparatus 1800 includes an obtaining module 1801 and a processing module 1802.

The obtaining module 1801 is configured to respectively obtain a first feedback current and a first feedback voltage from an output end of the filter inductor and an output end of the filter capacitor; and the processing module 1802 is configured to: obtain a first duty cycle and a second duty cycle based on the first feedback current, a maximum current reference value, and a minimum current reference value; obtain a third duty cycle based on the first feedback voltage and a voltage reference value in a voltage loop; select one of the first duty cycle, the second duty cycle, and the third duty cycle, and control the bidirectional power tube, so that a duty cycle of the bidirectional power tube is between the first duty cycle and the second duty cycle.

Optionally, if the third duty cycle is greater than or equal to the first duty cycle, the duty cycle of the bidirectional power tube is the first duty cycle; if the third duty cycle is less than or equal to the second duty cycle, the duty cycle of the bidirectional power tube is the second duty cycle; or if the third duty cycle is greater than the first duty cycle and less than the second duty cycle, the duty cycle of the bidirectional power tube is the third duty cycle.

Optionally, the first feedback current and the first feedback voltage are obtained in a stationary coordinate system; and the processing module 1802 is specifically configured to: perform coordinate conversion on the first feedback current, to obtain a second feedback current in a rotating coordinate system; obtain the first duty cycle and the second duty cycle based on the second feedback current, the maximum current reference value, and the minimum current reference value in the current loop; perform coordinate conversion on the first feedback voltage, to obtain a second feedback voltage in the rotating coordinate system; obtain the third duty cycle based on the second feedback voltage and the voltage reference value in the voltage loop; select one of the first duty cycle, the second duty cycle, and the third duty cycle as a first target duty cycle; and perform coordinate conversion on the first target duty cycle, to obtain a second target duty cycle in the stationary coordinate system, and control the bidirectional power tube, so that the duty cycle of the bidirectional power tube is between the first duty cycle and the second duty cycle.

Optionally, the current loop includes a first current loop and a second current loop; and the processing module 1802 is configured to: obtain the first duty cycle based on the second feedback current and the maximum current reference value in the first current loop; and obtain the second duty cycle based on the second feedback current and the minimum current reference value in the second current loop.

Optionally, the processing module 1802 is configured to: determine, as a new voltage reference value, a value obtained by subtracting a product of the first feedback current and a preset coefficient from the voltage reference value; and obtain the third duty cycle based on the first feedback voltage and the new voltage reference value.

Optionally, an upstream of the bus capacitor includes at least one of the following: an energy storage device, a photovoltaic device, or a wind power device.

It should be understood that the apparatus 1800 herein is implemented in a form of a functional module. The term "module" herein may be an application-specific integrated circuit (ASIC), an electronic circuit, a processor (for example, a shared processor, a dedicated processor, or a group processor) configured to execute one or more software or firmware programs, a memory, a combinational logic circuit, and/or another appropriate component that supports the described function. In an optional example, a person skilled in the art may understand that the apparatus 1800 may be specifically the processing unit of the inverter in the foregoing embodiments, or a function of the processing unit of the inverter in the foregoing embodiments may be integrated into the apparatus 1800. The apparatus 1800 may be configured to perform procedures and/or steps corresponding to the processing unit of the inverter in the foregoing method embodiment. To avoid repetition, details are not described herein again.

The apparatus 1800 has a function of implementing corresponding steps performed by the processing unit of the inverter in the foregoing method. The foregoing functions may be implemented by hardware, or may be implemented by hardware executing corresponding software. The hardware or the software includes one or more modules corresponding to the functions.

In this embodiment of this application, the apparatus 1800 in FIG. 18 may alternatively be a chip or a chip system, for example, a system on chip (SoC).

Figure 19:
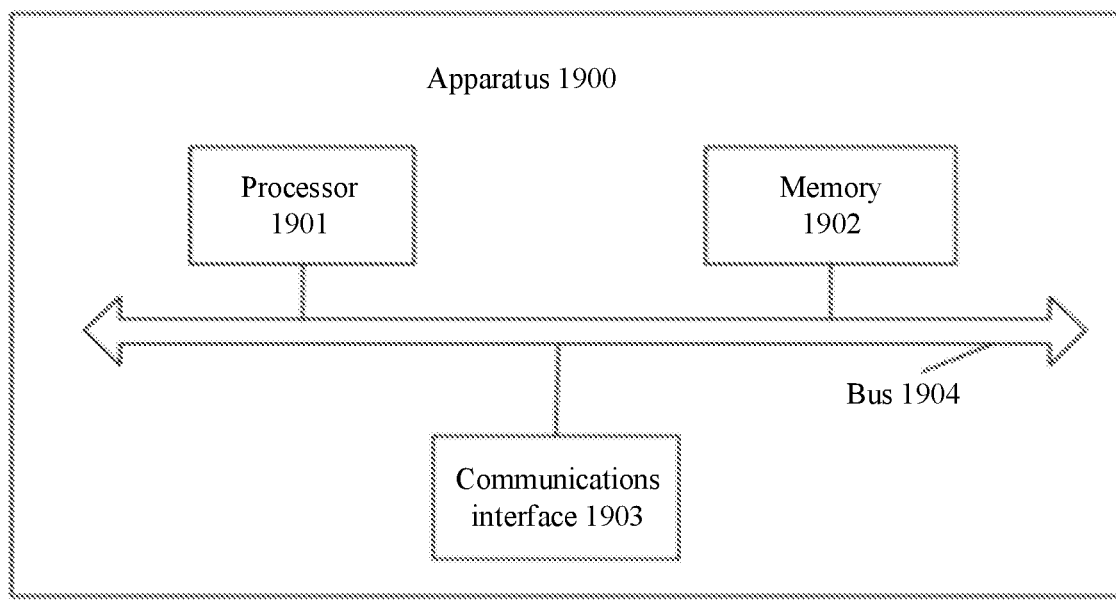
FIG. 19 is a schematic block diagram of another voltage control apparatus according to an embodiment of this application.

FIG. 19 shows a processing apparatus 1900 according to an embodiment of this application. The processing apparatus 1900 is a processing unit 1725 of the inverter 172 in the foregoing embodiment. The processing apparatus 1900 includes a processor 1901, a memory 1902, a communications interface 1903, and a bus 1904. The memory 1902 is configured to store instructions, and the processor 1901 is configured to execute the instructions stored in the memory 1902. The processor 1901, the memory 1902, and the communications interface 1903 implement a communication connection between each other through the bus 1904.

The processor 1901 is configured to: respectively obtain a first feedback current and a first feedback voltage from an output end of the filter inductor and an output end of the filter capacitor; obtain a first duty cycle and a second duty cycle based on the first feedback current, a maximum current reference value, and a minimum current reference value in a current loop; obtain a third duty cycle based on the first feedback voltage and a voltage reference value in a voltage loop; and select one of the first duty cycle, the second duty cycle, and the third duty cycle, and control the bidirectional power tube, so that a duty cycle of the bidirectional power tube is between the first duty cycle and the second duty cycle.

It should be understood that the apparatus 1900 may be specifically the processing unit of the inverter in the foregoing embodiments, or functions of the processing unit of the inverter in the foregoing embodiments may be integrated into the apparatus 1900. The apparatus 1900 may be configured to perform steps and/or procedures of the processing unit of the inverter in the foregoing method embodiment. Optionally, the memory 1902 may include a read-only memory and a random access memory, and provide instructions and data to the processor. A part of the memory may further include a non-volatile random access memory. For example, the memory may further store information about a device type. The processor 1901 may be configured to execute the instructions stored in the memory. When the processor executes the instructions, the processor may perform steps and/or procedures corresponding to the processing unit of the inverter in the foregoing method embodiment.

It should be understood that in embodiments of this application, the processor may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

In an implementation process, steps in the foregoing methods can be implemented by using a hardware integrated logical circuit in the processor, or by using instructions in a form of software. The steps of a method disclosed in embodiments of this application may be directly performed by a hardware processor, or may be performed by a combination of hardware and software modules in the processor. A software module may be located in a mature storage medium in the art, for example, a random access memory, a flash memory, a read-only memory, a programmable read-only memory, an electrically erasable programmable memory, or a register. The storage medium is located in the memory, and the processor executes the instructions in the memory and completes the steps in the foregoing method in combination with hardware of the processor. To avoid repetition, details are not described herein.

Persons of ordinary skill in the art may be aware that units and algorithm steps in examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for ease and brevity of description, for detailed working processes of a described system, apparatus, and unit, refer to corresponding processes in a foregoing method embodiment. Details are not described herein again.

In embodiments provided in this application, it should be understood that a disclosed system, apparatus, and method may be implemented in other manners. For example, a described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location or may be distributed on a plurality of network units. Some or all of the units may be selected based on an actual requirement to achieve objectives of solutions in embodiments.

In addition, functional units in embodiments of this application may be integrated into one processing unit, or may exist alone physically, or two or more units may be integrated into one unit.

When functions are implemented in a form of a software function unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of methods according to embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application may fall within the protection scope of this application.

What is claimed is:

1. A voltage control method, comprising:
respectively obtaining a first feedback current and a first feedback voltage from an output end of a filter inductor of a voltage source inverter and an output end of a filter capacitor of the voltage source inverter;
obtaining a first duty cycle and a second duty cycle based on the first feedback current, a maximum current reference value, and a minimum current reference value in a current loop, wherein the first duty cycle is greater than the second duty cycle;
obtaining a third duty cycle based on the first feedback voltage and a voltage reference value in a voltage loop; and
selecting one of the first duty cycle, the second duty cycle, or the third duty cycle and controlling a bidirectional power tube of the voltage source inverter such that a duty cycle of the bidirectional power tube is between the first duty cycle and the second duty cycle, wherein one end of the bidirectional power tube is connected to one end of the filter inductor, and another end of the filter inductor is connected to the filter capacitor.

2. The method according to claim 1, wherein:
based on the third duty cycle being greater than or equal to the first duty cycle, the duty cycle of the bidirectional power tube is the first duty cycle;
based on the third duty cycle being less than or equal to the second duty cycle, the duty cycle of the bidirectional power tube is the second duty cycle; or
based on the third duty cycle being greater than the first duty cycle and less than the second duty cycle, the duty cycle of the bidirectional power tube is the third duty cycle.

3. The method according to claim 1, wherein the first feedback current and the first feedback voltage are obtained in a stationary coordinate system; wherein obtaining the first duty cycle and the second duty cycle based on the first feedback current, the maximum current reference value, and the minimum current reference value in the current loop comprises: performing coordinate system conversion on the first feedback current to obtain a second feedback current in a rotating coordinate system; and obtaining the first duty cycle and the second duty cycle based on the second feedback current, the maximum current reference value, and the minimum current reference value in the current loop; wherein obtaining the third duty cycle based on the first feedback voltage and the voltage reference value in the voltage loop comprises: performing coordinate conversion on the first feedback voltage to obtain a second feedback voltage in the rotating coordinate system; and obtaining the third duty cycle based on the second feedback voltage and the voltage reference value in the voltage loop; and wherein selecting one of the first duty cycle, the second duty cycle, or the third duty cycle and controlling the bidirectional power tube comprises: selecting one of the first duty cycle, the second duty cycle, or the third duty cycle as a first target duty cycle; and performing coordinate conversion on the first target duty cycle to obtain a second target duty cycle in the stationary coordinate system, and controlling the bidirectional power tube such that the duty cycle of the bidirectional power tube is between the first duty cycle and the second duty cycle.

4. The method according to claim 3, wherein the current loop comprises a first current loop and a second current loop; and
wherein obtaining the first duty cycle and the second duty cycle based on the second feedback current, the maximum current reference value, and the minimum current reference value in the current loop comprises:
obtaining the first duty cycle based on the second feedback current and the maximum current reference value in the first current loop; and
obtaining the second duty cycle based on the second feedback current and the minimum current reference value in the second current loop.

5. The method according to claim 1, wherein obtaining the third duty cycle based on the first feedback voltage and the voltage reference value in the voltage loop comprises:
determining, as a new voltage reference value, a value obtained by subtracting a product of the first feedback current and a preset coefficient from the voltage reference value; and
obtaining the third duty cycle based on the first feedback voltage and the new voltage reference value.

6. The method according to claim 1, wherein at least one of an energy storage device, a photovoltaic device, or a wind power device is upstream of a bus capacitor of the voltage source inverter, wherein the bus capacitor is connected to another end of the bidirectional power tube.

7. An inverter, comprising:
a bus capacitor;
a bidirectional power tube;
a filter inductor;
a filter capacitor; and
a processing unit;
wherein the bus capacitor is connected to one end of the bidirectional power tube;
wherein another end of the bidirectional power tube is connected to one end of the filter inductor;
wherein another end of the filter inductor is connected to the filter capacitor;
wherein the filter inductor, the filter capacitor, and the processing unit are connected;
wherein the processing unit is configured to:
respectively obtain a first feedback current and a first feedback voltage from an output end of the filter inductor and an output end of the filter capacitor;
obtain a first duty cycle and a second duty cycle based on the first feedback current, a maximum current reference value, and a minimum current reference value in a current loop;
obtain a third duty cycle based on the first feedback voltage and a voltage reference value in a voltage loop; and
select one of the first duty cycle, the second duty cycle, or the third duty cycle and control the bidirectional power tube such that a duty cycle of the bidirectional power tube is between the first duty cycle and the second duty cycle.

8. The inverter according to claim 7, wherein:
based on the third duty cycle being greater than or equal to the first duty cycle, the duty cycle of the bidirectional power tube is the first duty cycle;
wherein based on the third duty cycle being less than or equal to the second duty cycle, the duty cycle of the bidirectional power tube is the second duty cycle; or
wherein based on the third duty cycle being greater than the first duty cycle and less than the second duty cycle, the duty cycle of the bidirectional power tube is the third duty cycle.

9. The inverter according to claim 7, wherein the first feedback current and the first feedback voltage are obtained in a stationary coordinate system; and wherein obtaining the first duty cycle and the second duty cycle based on the first feedback current, the maximum current reference value, and the minimum current reference value in the current loop comprises: performing coordinate system conversion on the first feedback current to obtain a second feedback current in a rotating coordinate system; and obtaining the first duty cycle and the second duty cycle based on the second feedback current, the maximum current reference value, and the minimum current reference value in the current loop; wherein obtaining the third duty cycle based on the first feedback voltage and the voltage reference value in the voltage loop comprises: performing coordinate conversion on the first feedback voltage to obtain a second feedback voltage in the rotating coordinate system; and obtaining the third duty cycle based on the second feedback voltage and the voltage reference value in the voltage loop; and wherein selecting one of the first duty cycle, the second duty cycle, or the third duty cycle and controlling the bidirectional power tube comprises: selecting one of the first duty cycle, the second duty cycle, or the third duty cycle as a first target duty cycle; and performing coordinate conversion on the first target duty cycle to obtain a second target duty cycle in the stationary coordinate system, and controlling the bidirectional power tube such that the duty cycle of the bidirectional power tube is between the first duty cycle and the second duty cycle.

10. The inverter according to claim 9, wherein the current loop comprises a first current loop and a second current loop; and
wherein obtaining the first duty cycle and the second duty cycle based on the second feedback current, the maximum current reference value, and the minimum current reference value in the current loop comprises:
obtaining the first duty cycle based on the second feedback current and the maximum current reference value in the first current loop; and
obtaining the second duty cycle based on the second feedback current and the minimum current reference value in the second current loop.

11. The inverter according to claim 7, wherein obtaining the third duty cycle based on the first feedback voltage and the voltage reference value in the voltage loop comprises:
determining, as a new voltage reference value, a value obtained by subtracting a product of the first feedback current and a preset coefficient from the voltage reference value; and
obtaining the third duty cycle based on the first feedback voltage and the new voltage reference value.

12. The inverter according to claim 7, further comprising:
at least one of an energy storage device, a photovoltaic device, or a wind power device upstream of the bus capacitor.

13. A voltage control apparatus, wherein the apparatus comprises: sensors configured to respectively obtain a first feedback current and a first feedback voltage from an output end of a filter inductor of a voltage source inverter and an output end of a filter capacitor of the voltage source inverter; and a processor configured to: obtain a first duty cycle and a second duty cycle based on the first feedback current, a maximum current reference value, and a minimum current reference value in a current loop; obtain a third duty cycle based on the first feedback voltage and a voltage reference value in a voltage loop; and select one of the first duty cycle, the second duty cycle, and the third duty cycle and control a bidirectional power tube such that a duty cycle of the bidirectional power tube of the voltage source inverter is between the first duty cycle and the second duty cycle.

14. The apparatus according to claim 13, wherein based on the third duty cycle being greater than or equal to the first duty cycle, the duty cycle of the bidirectional power tube is the first duty cycle;
wherein based on the third duty cycle being less than or equal to the second duty cycle, the duty cycle of the bidirectional power tube is the second duty cycle; or
wherein based on the third duty cycle being greater than the first duty cycle and less than the second duty cycle, the duty cycle of the bidirectional power tube is the third duty cycle.

15. The apparatus according to claim 13, wherein the first duty cycle is obtained based on a second feedback current and the maximum current reference value in a first current loop; and wherein the second duty cycle is obtained based on the second feedback current and the minimum current reference value in a second current loop.

\* \* \* \* \*